United States Patent [19]
Karaki et al.

[11] Patent Number: 5,895,006
[45] Date of Patent: Apr. 20, 1999

[54] PERFORATOR APPARATUS AND PERFORATING METHOD FOR PHOTO FILM, AND PHOTO FILM WORKING/ SECURING APPARATUS AND METHOD

[75] Inventors: Hideyuki Karaki; Akihiko Hase; Seiichi Yamashita; Takayuki Kambara; Akira Wakabayashi, all of Kanagawa, Japan

[73] Assignee: Fuji Photo Film Co., Ltd., Kanagawa, Japan

[21] Appl. No.: 08/852,023

[22] Filed: May 6, 1997

[30] Foreign Application Priority Data

May 8, 1996 [JP] Japan ................................ 8-113998
May 8, 1996 [JP] Japan ................................ 8-113999

[51] Int. Cl.$^6$ ........................ B65H 35/02; B65H 35/08; B26D 7/06
[52] U.S. Cl. ........................ 242/525.4; 242/526.1; 83/426; 83/436.1
[58] Field of Search ............. 242/525.4, 526.1; 83/426, 427, 433, 436.1

[56] References Cited

U.S. PATENT DOCUMENTS

| | | | |
|---|---|---|---|
| 3,083,926 | 4/1963 | Herr | 242/525.4 X |
| 4,928,562 | 5/1990 | Tanimura et al. | 83/278 |
| 5,461,450 | 10/1995 | Long et al. | 354/354 |

FOREIGN PATENT DOCUMENTS

| | | |
|---|---|---|
| 0 605 802 | 7/1994 | European Pat. Off. . |
| 0 750 216 | 12/1996 | European Pat. Off. . |
| 31 10417 | 10/1982 | Germany . |
| 2-222946 | 9/1990 | Japan . |

*Primary Examiner*—John Q. Nguyen
*Attorney, Agent, or Firm*—Sughrue, Mion, Zinn, Macpeak & Seas, PLLC

[57] ABSTRACT

A perforator apparatus for continuous photo film includes a perforator unit having a punch and a die. The perforator unit is disposed between first and second suction chambers. The photo film is extended past each of the suction chambers. A blower applies suction of air through the suction chambers, to apply tension to the photo film through the perforator unit. The perforator unit is disposed between a feed roller and a sprocket roller, which convey intermittently the photo film by a punching length. A first pass roller continuously conveys the photo film into the first suction chamber. A first loop of the photo film in the first suction chamber is maintained with a length substantially of an arc of a semi-circle defined between the first pass roller and the feed roller. A second pass roller continuously conveys the photo film from the second suction chamber. A second loop of the photo film in the second suction chamber is maintained with a length substantially of an arc of a semi-circle defined between the second pass roller and the sprocket roller. The perforator unit forms a train of perforations in the photo film along each of its two edges when the photo film is stopped.

21 Claims, 14 Drawing Sheets

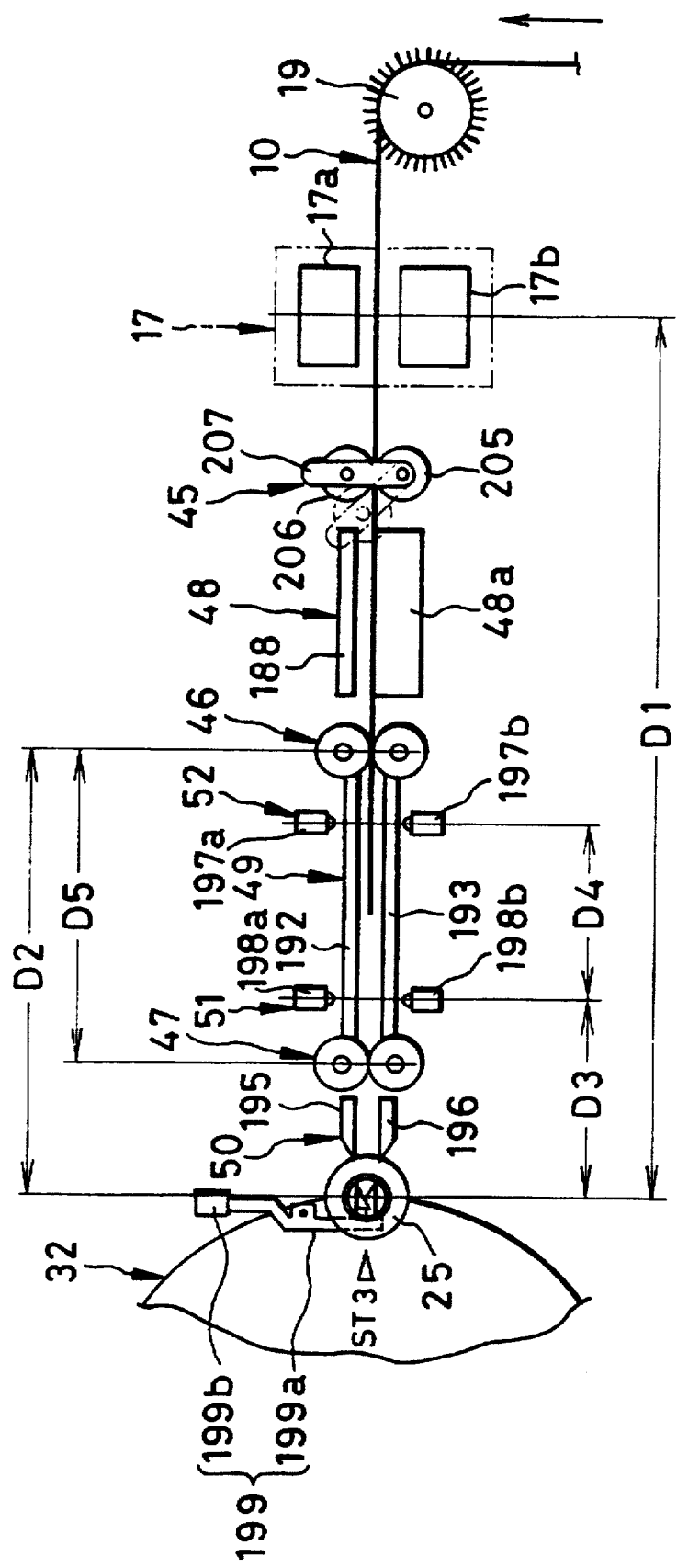

PERFORATOR APPARATUS AND PERFORATING METHOD FOR PHOTO FILM, AND PHOTO FILM WORKING/ SECURING APPARATUS AND METHOD

BACKGROUND OF THE INVENTION

1. Field of the Invention

The present invention relates to a perforator apparatus and a perforating method for photo film, and photo film working/ securing apparatus and method. More particularly, the present invention relates to photo film perforating, working, and/or securing apparatus and method of which an operating speed can be heightened.

2. Description Related to the Prior Art

U.S. Pat. No. 4,928,562 (corresponding to JP-A 1-271197) and U.S. Pat. No. 5,461,450 (corresponding to JP-A 6-339898) disclose a perforator apparatus in which continuous material, such as continuous photo film, is provided with perforations of a predetermined pattern. The perforator apparatus includes a punch and a die, which are operated when the continuous photo film is stopped in the course of intermittent conveyance, to form the perforations in the continuous photo film. To convey the continuous photo film to the punch and the die, there are a feed roller and a sprocket roller. The feed roller is arranged upstream from the punch/die set with reference to the conveying direction of the continuous photo film. The sprocket roller is arranged downstream from the punch/die set with reference to the conveying direction. It is also known to use a suction drum instead of the sprocket roller. The feed roller, the sprocket roller and/or the suction drum are driven to rotate by an indexing device.

The perforator apparatus has the single indexing device which is operated for rotating both the feed roller and the sprocket roller. Load of inertia applied to the indexing device is considerably high, so that it is extremely difficult to heighten the speed of the perforator apparatus.

In the perforator apparatus of the prior art, the conveying speed of the feed roller nipping the continuous photo film is determined smaller than the conveying speed of the sprocket roller nipping the continuous photo film downstream therefrom, so as to apply tension to the continuous photo film. The tension causes edges of the perforations of the continuous photo film tightly to contact sprocket teeth of the sprocket roller, to keep the continuous photo film positioned on the punch/die set in an unchanged manner. The precision in the position of forming the perforations is maintained. The continuous photo film receives the tension so high between the sprocket teeth of the sprocket roller and the feed roller, that it is likely that the perforations are damaged by the sprocket teeth of the sprocket roller, and that the continuous photo film is fogged by pressure or scratched by slips of the nip rollers. The nip rollers must be used in a limited condition related to the nipping force.

U.S. Pat. No. 5,461,450 (corresponding to JP-A 6-339898) discloses a method of applying the tension to the continuous photo film by use of suction chambers arranged on upstream and downstream sides of the punch/die set. There is a shortcoming in the perforator apparatus in that a surface of the continuous photo film contacts inner walls of the suction chambers to scratch the surface of the continuous photo film. It is likely that there occurs remarkable shake or undulation of loops of the continuous photo film, due to unfavorable position of the loops.

A photo filmstrip of a 35 mm type consists of a combination of a spool on which the photo filmstrip is wound and a cassette for containing the spool in a rotatable manner. To manufacture the photo filmstrip with the cassettes, a front end or trailer of the photo filmstrip is inserted into a slot formed in the spool, to retain retainer holes of the photo filmstrip on retainer hooks arranged in the slot, so that the front end of the photo filmstrip is secured to the spool. The photo filmstrip includes the sprocket roller, a trimmer unit, a photo film guide and an inserter roller arranged in the order listed. The continuous photo film is cut by the trimmer unit with a cutting operation for forming shapes of the front end and a rear end which is a photo film leader. The front end of the photo filmstrip is moved into the slot of the spool.

JP-A 2-222946 discloses a method in which the photo filmstrip is regularly fed by rotating the sprocket roller, and a photo film path of an air blowing structure is opened after the front end of the photo filmstrip is moved past the inserter roller. When the front end comes near to the spool, the inserter roller is slowed down to an inserting speed, so as to ensure retention of the retainer holes of the front end on the retainer hooks of the spool To shorten a cycle time of the system of JP-A 2-222946, a conveying speed of the photo filmstrip may be heightened. However this lengthens a distance by which the photo filmstrip is conveyed in a period which starts upon the passage of the front end of the photo filmstrip by the inserter roller and ends upon opening the photo film path. Also it lengthens a distance by which the photo filmstrip is conveyed in a period which starts upon opening the photo film path, and ends upon slowing down the conveying speed to the inserting speed. Consequently a distance between the inserter roller and the spool should be long enough. An insertion guide must be so long that the photo filmstrip is loosened between the inserter roller and the spool. An inserting operation is so unstable that the photo filmstrip is likely to be bent before insertion.

SUMMARY OF THE INVENTION

In view of the foregoing problems, an object of the present invention is to provide a perforator apparatus and a perforating method which can perforate continuous material at a high speed, and in which the tension of the continuous material in a perforating station can be suitably controlled.

Another object of the present invention is to provide a photo film working/securing apparatus and method in which the front end of the photo filmstrip can be retained on the spool reliably even with a heightened conveying speed of the photo filmstrip.

In order to achieve the above and other objects and advantages of this invention, a perforator apparatus for continuous material being conveyed continuously includes a perforator unit having a punch and a die, the perforator unit forming a train of perforations in the continuous material along at least one edge thereof when the continuous material is stopped. A first suction chamber is disposed upstream from the perforator unit, the continuous material being extended past the first suction chamber. A second suction chamber is disposed downstream from the perforator unit, the continuous material being extended past the second suction chamber. At least one blower is connected to the first and second suction chambers, for applying suction of air, to apply tension to the continuous material through the perforator unit. A feed roller is disposed on a downstream side of the first suction chamber, and operated cyclically in one cycle including a stopping step of stopping for operation of the perforator unit, and a rotating step of conveying the continuous material toward the perforator unit by a predetermined punching length. A sprocket roller is disposed on an upstream side of the second suction chamber, and operated cyclically in the one cycle including the stopping step of stopping for operation of the perforator unit, and the rotating step of conveying the continuous material from the perforator unit by the predetermined punching length. A first pass roller is disposed on an upstream side of the first suction chamber, for conveying the continuous material continuously by the predetermined punching length during the one cycle, to maintain a first loop in the first suction chamber with a length substantially of an arc of a semi-circle defined between the first pass roller and the feed roller. A second pass roller is disposed on a downstream side of the second suction chamber, for conveying the continuous material continuously by the predetermined punching length during the one cycle, to maintain a second loop in the second suction chamber with a length substantially of an arc of a semi-circle defined between the second pass roller and the sprocket roller.

In a preferred embodiment, the first pass roller is disposed at a first distance from the feed roller. The second pass roller is disposed at a second distance from the sprocket roller, the second distance being equal to the first distance, so as to balance application of the suction to the first and second loops between the first and second suction chambers.

Furthermore, a first indexing device rotationally controls the feed roller. A second indexing device rotationally controls the sprocket roller.

In accordance with the present invention, it is possible to perforate continuous material at a high speed, and also to control the tension of the continuous material suitably in a perforating station.

In a photo film working/securing apparatus, a combination of a photo filmstrip and a spool, with the photo filmstrip secured thereto, is produced, wherein the photo filmstrip is produced from continuous photo film conveyed with a front end thereof directed toward the spool. The photo film working/securing apparatus includes a trimmer unit for cutting the continuous photo film to produce the photo filmstrip while the continuous photo film is stopped. A rear conveyor unit is disposed upstream from the trimmer unit, for conveying the continuous photo film downstream intermittently by a predetermined length, the predetermined length being set according to an available frame number of the photo filmstrip. A front conveyor unit is respectively disposed downstream from the trimmer unit, for conveying the continuous photo film downstream intermittently by the predetermined length, the front conveyor unit letting off downstream a rear end of the photo filmstrip disposed upstream thereon after being cut by the trimmer unit. A rear support unit is disposed downstream from the front conveyor unit, for guiding the front end downstream. A first advance roller set is disposed downstream from the rear support unit, for conveying the front end downstream. A front support unit is disposed downstream from the first advance roller set, for guiding the front end downstream. A second advance roller set is disposed downstream from the front support unit, rotated in a synchronized manner with the first advance roller set, for conveying the front end downstream. A spool holder is disposed downstream from the front support unit, for supporting the spool.

In a preferred embodiment, there is a conveyor shifter, connected to the front conveyor unit, for shifting the front conveyor unit, to direct an exit thereof downwards with an inclination, the exit being located on a downstream side of the front conveyor unit.

The trimmer unit and the spool holder are disposed so that a distance between a center of the trimmer unit and the spool in the spool holder is equal to or shorter than a length of the photo filmstrip associated with a minimum of the available frame number of the photo filmstrip.

Furthermore, an insert guide is disposed between the second advance roller set and the spool, secured to an end of the front support unit, and including lower and upper guide members having respective guide surfaces, the guide surfaces being curved in a width direction of the continuous photo film, for curling the front end in the width direction during conveyance to the spool in the spool holder, so as to heighten rigidity of the front end with respect to a length direction of the photo filmstrip.

In the present invention, the front end of the photo filmstrip can be retained on the spool reliably even with a heightened conveying speed of the photo filmstrip.

BRIEF DESCRIPTION OF THE DRAWINGS

The above objects and advantages of the present invention will become more apparent from the following detailed description when read in connection with the accompanying drawings, in which:

FIG. 8A is an explanatory view in enlargement, illustrating a main portion of the photo film working/securing apparatus;

DETAILED DESCRIPTION OF THE PREFERRED EMBODIMENTS OF THE PRESENT INVENTION

Figure 1:
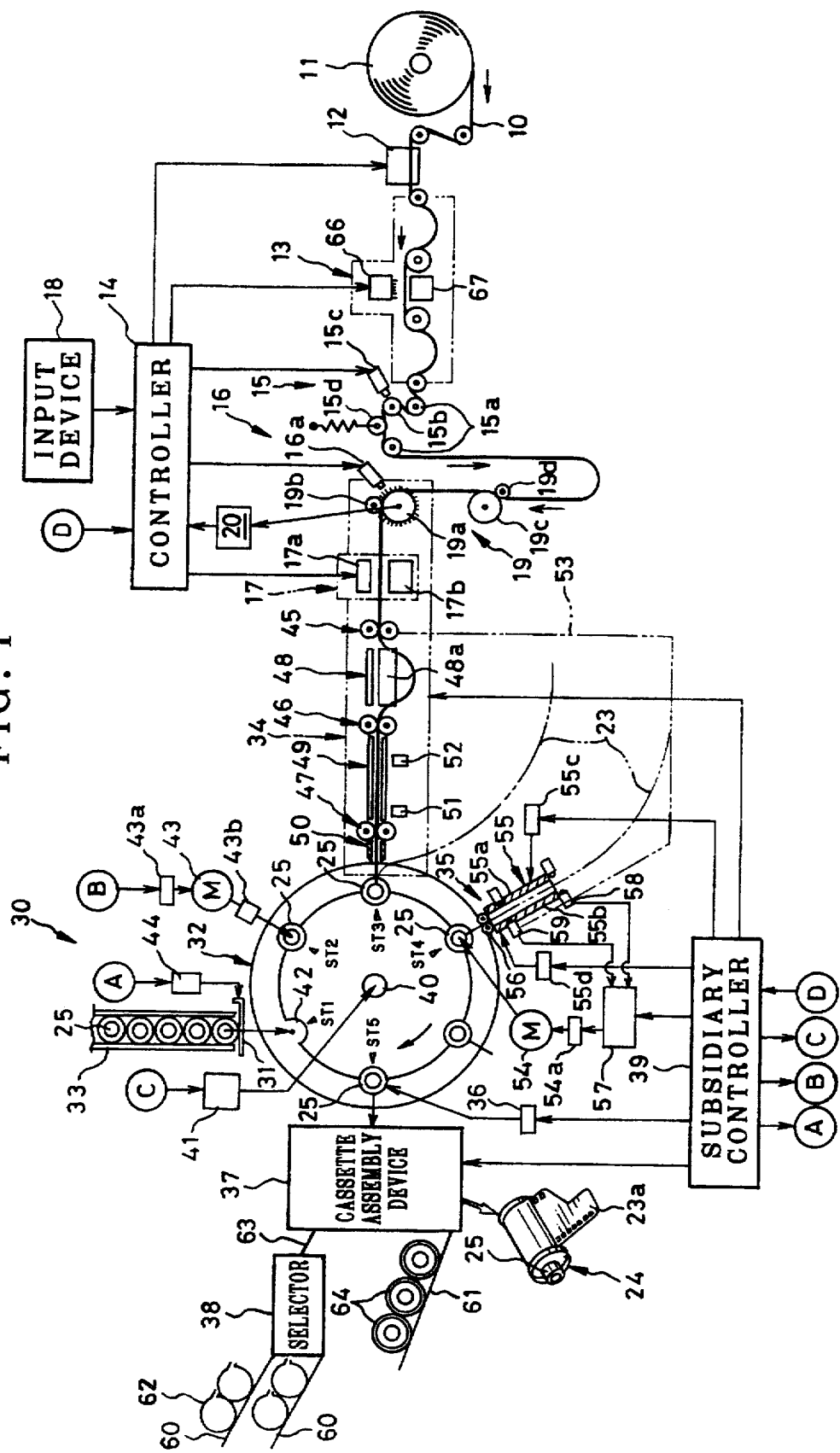
FIG. 1 is an explanatory view in elevation, illustrating a system for manufacturing a photo film cassette.

In FIG. 1, a system for manufacturing a photo film cassette is illustrated. A continuous photo film 10 is drawn from a photo film roll 11, is passed through a photo film splicer 12 and is conveyed to a perforator apparatus 13 of the present invention. The photo film splicer 12 connects a distal rear end of a preceding continuous photo film having been drawn entirely from the roll 11 to a distal front end of the continuous photo film 10 being newly set. The perforator apparatus 13 consists of a punch 66 and a die 67 to be described later in detail. A controller 14 controls the perforator apparatus 13, in which the punch 66 is moved up and down while the continuous photo film 10 is stopped in the course of intermittent conveyance, so that two trains of perforations are regularly formed in the continuous photo film 10 along its respective edges. The continuous photo film 10 having the perforations is conveyed through a side belt printer 15 and a dot printer 16, and sent into a trimmer unit 17.

The side belt printer 15 is constituted by a guide roller 15a, a pair of length-measuring rollers 15b, a printer body 15c and a tensioner 15d. The length-measuring rollers 15b include a drive roller having sprocket teeth in mesh with the perforations, and a pressing roller coaxial therewith. The length-measuring rollers 15b are associated with a rotary encoder, which generates a pulse upon rotation of the length-measuring rollers 15b by a predetermined angle. Pulses from the rotary encoder are counted by the controller 14. According to the number of the counted pulses, an amount of conveying the continuous photo film 10 is determined. Note that the length-measuring rollers 15b are depicted in FIG. 1 in such a manner that only an end face of one of them is seen.

An input device 18 inputs information of a photo film strip length to the controller 14. In accordance with the length information being input, the controller 14 selects information among plural kinds of preset information to be imprinted. The controller 14, in response to a signal from the rotary encoder, operates the printer body 15c. The printer body 15c imprints the information to one or both of the narrow edge areas in a belt shape in accordance with a photo film type.

The continuous photo film 10 after the side printing is looped as a free loop, and then conveyed to a rear conveyor unit 19. The dot printer 16 includes the rear conveyor unit 19 and a printer body 16a. The rear conveyor unit 19 consists of a pair including a sprocket roller 19a and a pressing roller 19b, and a pair including a feed roller 19c and a pressing roller 19d. A rotational speed of the feed roller 19c is lower than that of the sprocket roller 19a by 0.1–3%, so that sufficient tension is applied to the continuous photo film 10. A rotary encoder 20 is associated with the sprocket roller 19a. The dot printer 16 photographically imprints information such as a DX bar code, frame numbers, frame number bar codes, and a product name in accordance with the photo film strip length. The imprinted information will be visualized when the photo filmstrip is developed after taking exposures. As products of photo film, there are at least three strip lengths, including 36-exposure length, 24-exposure length and 12-exposure length. The lengths are standardized as sufficient for a train of 36, 24 and 12 frames.

After the printing operation in the rear conveyor unit 19, the continuous photo film 10 is conveyed to the trimmer unit 17. The trimmer unit 17 is constituted by a movable blade 17a and a stationary blade 17b. When the continuous photo film 10 is conveyed by a length according to the photo film strip length, the trimmer unit 17 cuts the continuous photo film 10 to obtain a photo filmstrip 23 of the predetermined length. In a cutting operation of the trimmer unit 17, distal ends of the photo filmstrip 23 are worked. A rear end 23a of the photo filmstrip 23 is cut in the shape of a photo film leader. A front end 10b (See FIGS. 8 and 13) of the photo filmstrip 23 is cut in the shape of a photo film trailer. Also the trimmer unit 17 operates for cutting holes adapted to retention of the photo filmstrip 23 to a spool 25. The rear end 23a of the photo filmstrip 23 will be wound as an outermost turn of the roll when a photo film cassette 24 is obtained. The front end 10b of the photo filmstrip 23 will be retained on the spool 25.

The continuous photo film 10 from the trimmer unit 17 is conveyed to the spool 25 set in a photo film winder apparatus 30. Details of the winder apparatus 30 are disclosed in EP-A 0 750 216 (corresponding to U.S. Ser. No. 08/667, 469). The winder apparatus 30 includes a spool turret 32, a stacker 33, a photo film inserter 34, a photo film winder unit 35, a spool transfer unit 36, a cassette assembly device 37 and a selector 38, all of which are controlled by a subsidiary controller 39. The controller 14 sends information of the photo film strip length to the subsidiary controller 39. The subsidiary controller 39 sends to and receives from the controller 14 a control signal, so that conveyance of the continuous photo film 10 is synchronized.

The spool turret 32 is supported on a shaft 40 in a rotatable manner thereabout. An indexing device 41 of a mechanical structure rotates the spool turret 32 in an intermittent manner by 60 degrees, that is one sixth of one rotation. The spool turret 32 has six spool holders 42.

In Station ST1, the spool 25 supplied by the stacker 33 is set on one of the spool holders 42. Under the stacker 33 is located a shutter 31, which is opened and closed by an actuator 44. The shutter 31 is operated to let the one spool 25 out of the stacker 33.

In Station ST2, a spool drive shaft is shifted and coupled with the spool 25. A positioning claw of the spool drive shaft is caused to contact an axial end of the spool 25 while the spool drive shaft is rotated. When the positioning claw is captured in a recess or notch for engagement, a torque limiter 43b is responsively operated to stop rotation of the spool 25. A receiving slot of the spool 25 is rotationally moved and oriented in a radial direction of the spool turret 32.

In Station ST3, the photo film inserter 34 inserts the front end 10b into the slot of the spool 25. The photo film inserter 34 includes the rear conveyor unit 19, a front conveyor unit 45, a first advance roller set 46 having two nip rollers, a second advance roller set 47 having two nip rollers, a rear support unit 48, a front support unit 49 and a insert guide 50. Before inserting the front end 10b of the continuous photo film 10 into the spool 25, a first passage sensor 51 detects the front end 10b. According to a detecting signal from the first passage sensor 51, feeding speed of the two pairs of the advance roller sets 46 and 47 is reduced from an initial speed V1 to an inserting speed V2.

Prior to the slowing operation, the front end of the continuous photo film 10 is detected by a second passage sensor 52. In response, a swingable rear support plate set 48a of the rear support unit 48 is set in an open position, to open a photo film loop chamber 53 under the rear support unit 48. Even after the front end 10b is retained on the spool 25, the rear conveyor unit 19 and the front conveyor unit 45 rotate to convey the continuous photo film 10 by the predetermined length, so that the continuous photo film 10 is reserved in a looped form in the loop chamber 53. After the conveyance by the predetermined length, the trimmer unit 17 is actuated to cut the continuous photo film 10 to produce the photo filmstrip 23. After the retention of the front end 10b on the spool 25, the front support unit 49 and the insert guide 50 are set in the open position to open the loop chamber 53 under the front support unit 49 and the insert guide 50.

In Station ST4, a spool drive shaft is connected to a motor 54. The motor 54 is rotated to wind the photo filmstrip 23 in the loop chamber 53 about the spool 25. A pair nip rollers 56 are arranged on a photo film guide 55. The nip rollers 56 apply load to the photo filmstrip 23. This load renders the roll of the photo filmstrip 23 tight about the spool 25. The motor 54 is controlled by a motor control unit 57 via a driver 54a. There are disposed photo film sensors 58 and 59, which, during the winding operation, detect the rear end of the photo filmstrip 23. According to a detecting signal, the motor 54 is stopped via the driver 54a. Shortly before the stop of the motor 54, it has been detected that a predetermined length of the photo filmstrip 23 is wound. Upon this detection, the motor control unit 57 changes the motor 54 from the high speed to the low speed. A final portion of the photo filmstrip 23, irrespective of the predetermined length of the photo filmstrip 23, is wound at a low speed, so that the remaining unwound length of the photo filmstrip 23 is kept common.

The photo film guide 55 includes guide plates 55a and 55b disposed to extend in a radial direction of the spool turret 32. The guide plates 55a and 55b are movable, and opened by a plate opener mechanism 55c when the spool turret 32 rotates in a manner of a tact system. Thus the photo filmstrip 23 from Station ST3 and the rear end 23a wound in Station ST4 can be smoothly transferred to Station ST5D In Station ST5, the spool 25 with the roll of the photo filmstrip 23 is removed by the spool transfer unit 36, and transferred to the cassette assembly device 37. With the cassette assembly device 37, cassette suppliers 60, the selector 38 and a cap hopper 61 are connected. The cassette suppliers 60 include plural lines each of which is associated with photo film strip lengths. Each of the cassette suppliers 60 contains a plurality of the tubular bodies 62, which consists of a thin metal plate rounded in a cylindrical shape, and on which information is printed, such as a DX code and a manufacturer's name in accordance with the photo film strip length.

The controller 14 causes the subsidiary controller 39 to operate the selector 38 in accordance with the photo film strip length designated through the input device 18. One of the cassette suppliers 60 is selected. The tubular bodies 62 are supplied from the selected one of the cassette suppliers 60 through a chute 63 and transferred to the cassette assembly device 37. Caps 64 are supplied by the cap hopper 61 and transferred to the cassette assembly device 37 by two.

The cassette assembly device 37 is controlled by the subsidiary controller 39, and assembles parts of the photo film cassette 24. The cassette assembly device 37 inserts the spool 25 with the photo filmstrip 23 into one of the tubular bodies 62, and then fits two caps 64 on ends of the one of the tubular bodies 62 to build the photo film cassette 24. Note that it is also possible that the cassette assembly device 37 can be directly connected to one cassette supplier instead of using the plural cassette suppliers 60. Alternatively it is possible as a modified method that the cassette assembly machine is supplied successively with a half-open cassette in which one cap is fitted on a tubular body. The cassette assembly device 37 inserts the spool 25 with the photo filmstrip 23 into the half-open cassette through its open end, and fits another cap on the open end to build the photo film cassette 24. Of course it is possible that the photo film winder apparatus 30 can be directly connected to the cassette assembly machine of the half-open-cassette type without use of the spool transfer unit 36.

Figure 2:
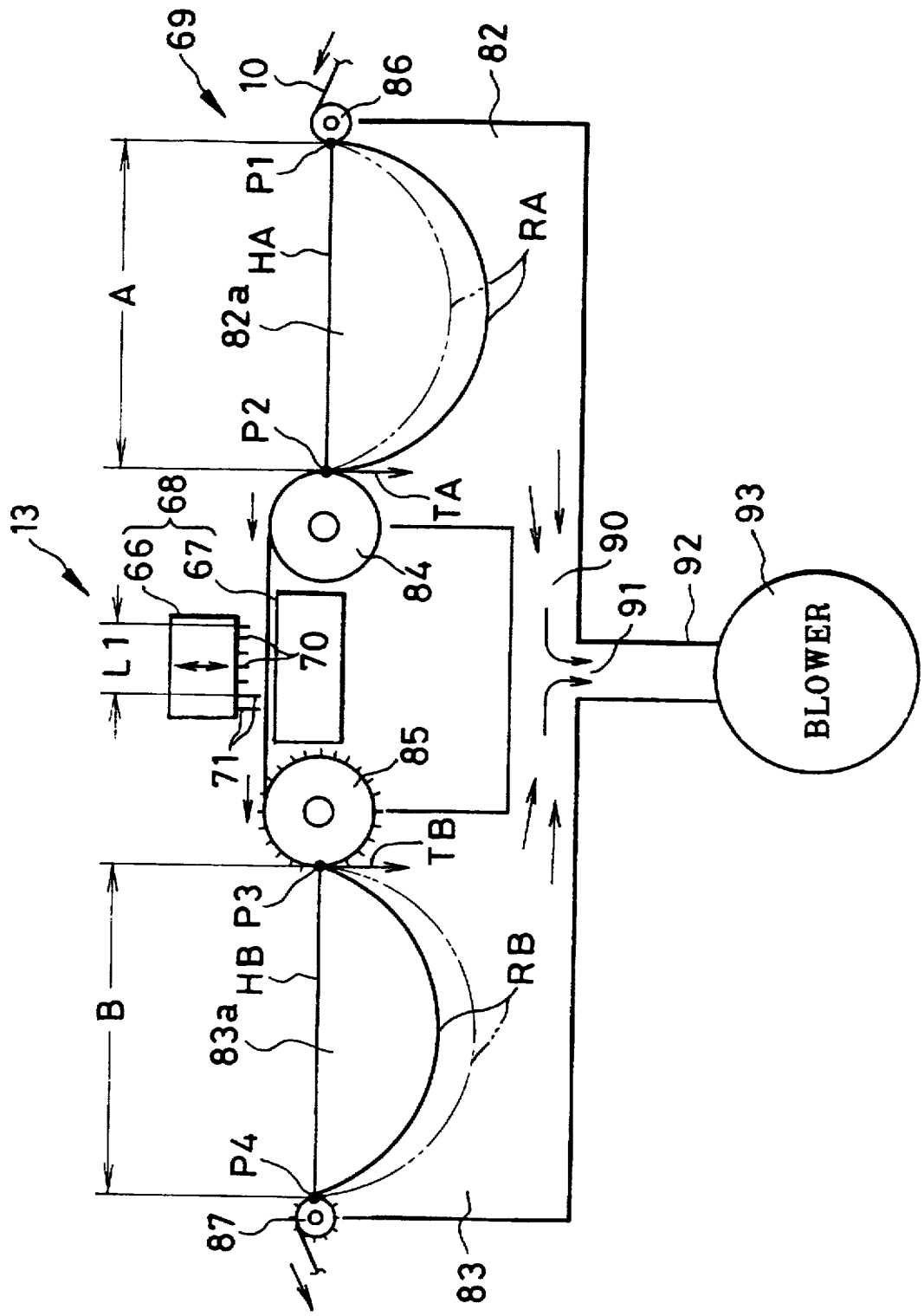
FIG. 2 is an explanatory view illustrating a perforator apparatus in the cassette manufacturing system.

FIG. 2 is a front elevation where the perforator apparatus 13 of the present invention is depicted The perforator apparatus 13 is constituted by a perforator unit 68 and an intermittent feeder 69. The perforator unit 68 includes the punch 66 and the die 67. When the intermittent feeder 69 is temporarily stopped from moving the continuous photo film 10, the punch 66 moves down and up one time, for the perforator unit 68 to form a number of perforations in the continuous photo film 10 along its edges.

The punch 66 has punch portions 70 for forming perforations, and two pairs of pilot guides 71. The punch portions 70 and the pilot guides 71 are disposed in two lines associated with edges of the continuous photo film 10, and arranged at an equal pitch. The pilot guides 71 have bottoms lower than those of the punch portions 70, and have a sharply tapered guide surface. The two pairs of pilot guides 71 are inserted in two pairs of adjacent perforations formed by the punch portions 70, to position the continuous photo film 10 during the perforation operation. The intermittent feeder 69 conveys the continuous photo film 10 intermittently by the conveying length L1 and stops it in a position where two newest pairs of adjacent perforations formed by the punch portions 70 are located directly under the pilot guides 71. Thus it is possible that a pitch between one group of simultaneously formed perforations and a next group of simultaneously formed perforations is kept unchanged, so as to keep the pitch of perforations all equal. Note that the number of the pairs of the pilot guides 71 may be changed. Only one pair of the pilot guides 71 may be used.

Figure 3:
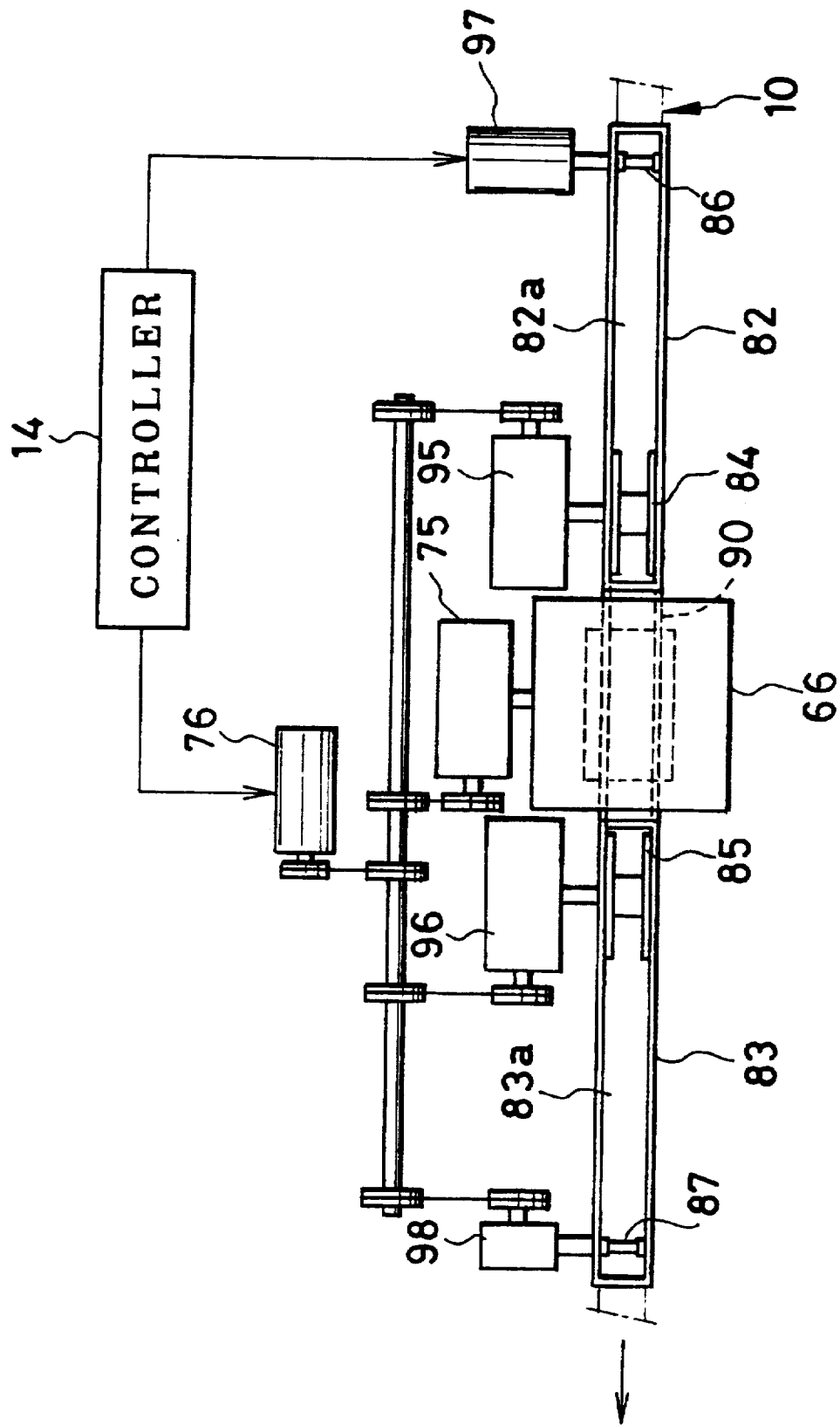
FIG. 3 is a top plan illustrating the perforator apparatus.
Figure 4:
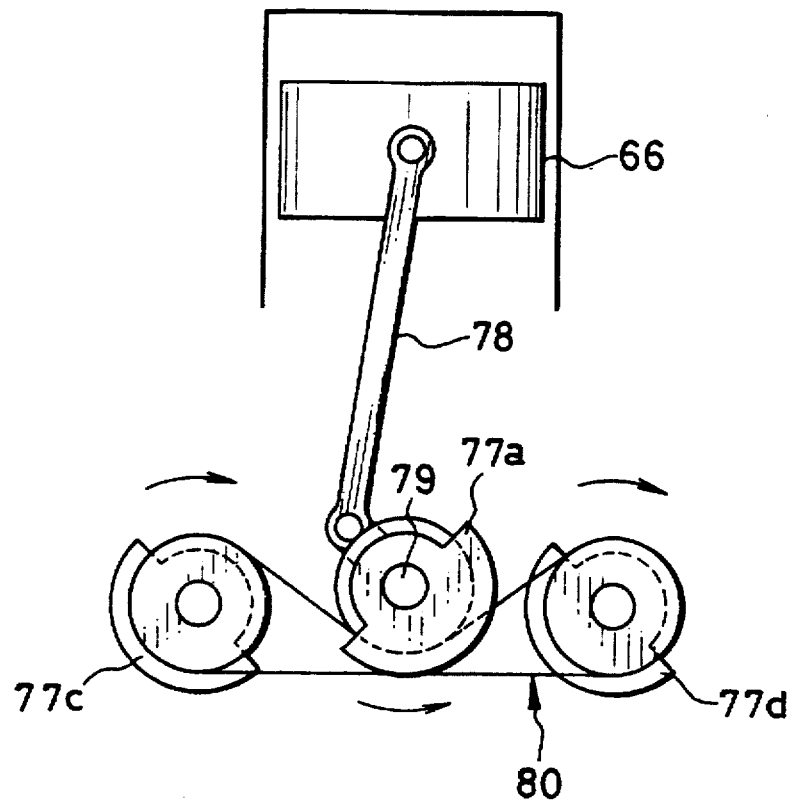
FIG. 4 is an elevation illustrating a double-axle balancer associated with a punch.
Figure 5:
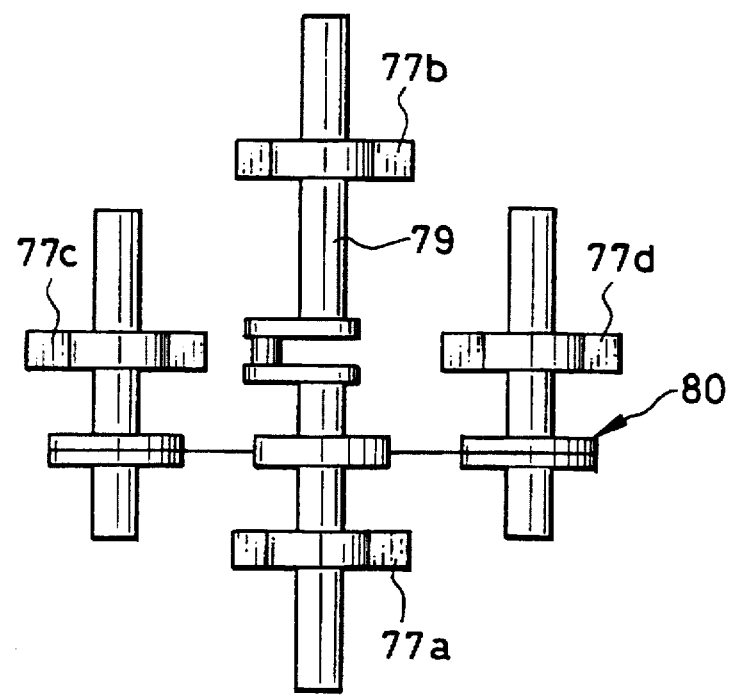
FIG. 5 is an explanatory view in plan, illustrating the double-axle balancer.

In FIG. 3, an up-down drive mechanism 75 incorporates a slider crank mechanism known in the art. The up-down drive mechanism 75 converts rotation of a motor 76 into vertical reciprocal movement of the punch 66. As depicted in FIGS. 4 and 5, a structure of a double-axle balancer is used to absorb vertical vibration due to the punch 66. Four eccentric rings 77a, 77b, 77c and 77d with eccentric load are used to rotate in synchronism with the reciprocal movement of the punch 66. The positions and rotational directions of the eccentric rings 77a–77d are determined such that a sum of force of inertia of the punch 66 and force of inertia of the eccentric rings 77a–77d is zero both with respect to the vertical direction and with respect to the horizontal direction. Let the punch 66 have a weight M. The weight of each of the eccentric rings 77a–77d is M/4. Note that a reference numeral 78 designates a connecting rod, 79 a crank shaft, and 80 a transmission mechanism which includes a chain, a gear train and the like for transmitting rotation of the crank shaft 79 to the eccentric rings 77a–77d.

In FIG. 2, the intermittent feeder 69 includes a first suction chamber 82 or decompression chamber, a second suction chamber 83 or decompression chamber, a feed roller 84, a sprocket roller 85, a first pass roller 86, and a sprocket pass roller or second pass roller 87. The first suction chamber 82 is disposed upstream from the perforator unit 68 with respect to conveyance of the continuous photo film 10. The second suction chamber 83 is disposed downstream from the perforator unit 68.

In FIG. 3, the suction chambers 82 and 83 have a rectangular box shape having an inner width of 36 mm, which is 1 mm greater than 35 mm as a width of the continuous photo film 10. Tops of the suction chambers 82 and 83 have respective openings 82a and 83a. The first pass roller 86 is disposed on an upstream side of the opening 82a of the first suction chamber 82. The feed roller 84 is disposed on a downstream side of the opening 82a. The sprocket roller 85 is disposed on an upstream side of the opening 83a of the second suction chamber 83. The second pass roller 87 is disposed on a downstream side of the opening 83a. In FIG. 2, a distance A is set equal to a distance B, where the distance A is defined between the first pass roller 86 and the feed roller 84 of the first suction chamber 82 or between ends of the loop, and the distance B is defined between the second pass roller 87 and the sprocket roller 85 of the second suction chamber 83 or between ends of the loop. Note that although the present embodiment has a gap of 1 mm between the inside of the suction chambers 82 and 83 and the continuous photo film 10, but that this gap may be changed. A preferable range of this gap is 0.5–5 mm.

Bottoms of the suction chambers 82 and 83 are interconnected by a connecting duct 90. The connecting duct 90 has a blower connecting port 91, to which a blower 93 is connected by a main duct 92. The blower 93 regulates the pressure of suction in the suction chambers 82 and 83, and sucks portions of the continuous photo film 10 in the suction chambers 82 and 83 downwards in looped forms under the openings 82a and 83a. The openings 82a and 83a have an equal length, so that a loop RA of the continuous photo film 10 has a distance A between its fulcrums equal to a distance B between fulcrums of a loop RB. The pressure of the first suction chamber 82 is equal to that of the second suction chamber 83 due to the blower 93. Accordingly an upstream tension TA applied to the continuous photo film 10 by the suction is equal to a downstream tension TB applied to the continuous photo film 10 by the suction.

The feed roller 84 and the sprocket roller 85 have a greater diameter than that of the pass rollers 86 and 87. The pressure of contact of the feed roller 84 and the sprocket roller 85 to the continuous photo film 10 is relatively small according to greatness of an area of their contact. Therefore it is possible to avoid scratching the continuous photo film 10 in the course of the intermittent conveyance. Each of the feed roller 84 and the sprocket roller 85 consists of a cylindrical portion and a pair of disk portions which are disposed on its ends for contacting the continuous photo film 10 without contact between the cylindrical portion and the continuous photo film 10. Also each of the pass rollers 86 and 87 consists of a cylindrical portion and a pair of disk portions which keep the cylindrical portion from contacting the continuous photo film 10. The second pass roller 87 has sprocket teeth.

In FIG. 3, rotation of the motor 76 is transmitted to the feed roller 84 by a first indexing device 95 included in a first loop regulator, and also transmitted to the sprocket roller 85 by a second indexing device 96 included in a second loop regulator. The feed roller 84 and the sprocket roller 85 convey the continuous photo film 10 in synchronism with the reciprocal movement of the punch 66.

The first pass roller 86 of the first suction chamber 82 is continuously rotated by a motor 97 constituting a first rotation transmission mechanism in the first loop regulator. There is a speed changer 98 constituting a second rotation transmission mechanism in the second loop regulator. The speed changer 98 transmits rotation of the motor 76 to the second pass roller 87 of the second suction chamber 83 for continuous rotation. The peripheral speed of the pass rollers 86 and 87 is set as a line speed of a manufacturing system of FIG. 1 for the photo film cassette. The conveying length L1 of the intermittent conveyance of the sprocket roller 85 and the feed roller 84 is set equal to a length by which the pass rollers 86 and 87 convey the continuous photo film 10 in one cycle time continuously.

In FIG. 2, an initializing operation forms a free loop RA in the first suction chamber 82 and a free loop RB in the second suction chamber 83. The length of the free loop RA is regularly changed within a range of the length L1, because the feed roller 84 intermittently rotates while the first pass roller 86 continuously rotates. L1 is the predetermined conveying length by which the feed roller 84 is rotated intermittently. Note that, to be strictly precise, the range of changes of the loop length is slightly smaller than L1, because the first pass roller 86 continuously conveys the continuous photo film 10. Also the length of the free loop RB is regularly changed within a range of the length L1, because the sprocket roller 85 intermittently rotates while the second pass roller 87 continuously rotates. L1 is the predetermined conveying length by which the sprocket roller 85 is rotated intermittently.

The free loop RA has a shape indicated by the solid line when maximized in the length. This shape is substantially a semi-circle defined so that its diameter is constituted by a line segment HA from a point P1 on the first pass roller 86 to a point P2 on the feed roller 84. Similarly the free loop RB has a shape indicated by the phantom line when maximized in the length. This shape is substantially a semi-circle defined so that its diameter is constituted by a line segment HB from a point P3 on the sprocket roller 85 to a point P4 on the second pass roller 87. To be more precise, the line segment HA has a length equal to that of the line segment HB. The free loop RA when maximized in the length has a substantially equal shape to the free loop RB when maximized in the length. Again it is considered that the conveying length L1 of the intermittent conveyance of the sprocket roller 85 and the feed roller 84 is set equal to the length by which the pass rollers 86 and 87 convey the continuous photo film 10 in one cycle time continuously. Let RLmax be the maximized length of the free loops RA and RB. The minimized length of the free loops RA and RB indicated in the suction chambers 82 and 83 in FIG. 2 is equal to or smaller than a difference (RLmax—L1). Note that the conveying length L1 is set sufficiently smaller than the maximized length RLmax. Due to the intermittent conveyance, the shape of the free loops RA and RB is changed but within a range close to the semi-circular shape. When the shape of the free loops RA and RB is changed, there is a change in the volume of a region defined between the free loop RA and the inside of the first suction chamber 82 or between the free loop RB and the inside of the second suction chamber 83. The change in the tension of the free loop RA or RB becomes greater. However it is effectively possible to suppress remarkable shake or undulation because the looped shape with the maximized length RLmax is semi-circular.

The operation of the above embodiment is described now. When the manufacturing system for the photo film cassette is initially started for operations a photo film leader (not shown) of the continuous photo film 10 is set in paths of each of sections of the system. In the perforator apparatus 13, the initializing operation is effected to form the free loops RA and RB of the predetermined length. The free loops RA and RB are determined to have a semi-circular shape when maximized in the length, so that the free loops RA and RB do not contact the inside of the suction chambers 82 and 83. This is effective in avoiding scratching the continuous photo film 10. The lengths of the free loops RA and RB are changed only in the ranges equal to or smaller than the semi-circle. Accordingly the continuous photo film 10 can be intermittently conveyed with stability without remarkable shake or undulation.

To form the free loop RA initially, the continuous photo film 10 is placed on the first pass roller 86 and the feed roller 84 in a substantially straight manner. The controller 14 causes at least one of the first indexing device 95 and the motor 97 to rotate at least one of the first pass roller 86 and the feed roller 84, to convey the continuous photo film 10. The controller 14 monitors operations of the first indexing device 95 and the motor 97, and measures a first length by which the first pass roller 86 has conveyed the continuous photo film 10 and a second length by which the feed roller 84 has conveyed the continuous photo film 10. When a difference between the first and second lengths increases to a predetermined value, the controller 14 stops the first pass roller 86 and the feed roller 84 to form the first loop RA initially. The predetermined value is based on the distance HA between the first pass roller 86 and the feed roller 84.

Then the indexing devices 95 and 96 respectively rotate the feed roller 84 and the sprocket roller 85 intermittently to convey the continuous photo film 10 by the length L1. In FIG. 2, the punch 66 is moved down by the up-down drive mechanism 75 while the continuous photo film 10 is stopped, to form a predetermined number of perforations in the continuous photo film 10. Before the perforating operation, the pilot guides 71 of the punch 66 are moved down and inserted in the newest two pairs of the perforations, to position the continuous photo film 10. After the positioning, the punch portions 70 form two trains of perforations arranged at a regular pitch.

The pressure of suction in the suction chambers 82 and 83 is kept constant, so that the upstream tension applied to the continuous photo film 10 is equal to a downstream tension TB applied to the continuous photo film 10. Force applied to teeth of the sprocket roller 85 comes to include a component of force of inertia created in accelerating or decelerating the continuous photo film 10, and not a component of the tensile force from the continuous photo film 10. The total force applied to the teeth of the sprocket roller 85 is reduced. Thus the continuous photo film 10 is prevented from having damage of the periphery of perforations, and from being fogged with pressure, It is also possible to position the continuous photo film 10 prior to the perforating operation by use of the pilot guides 71.

Figure 6:
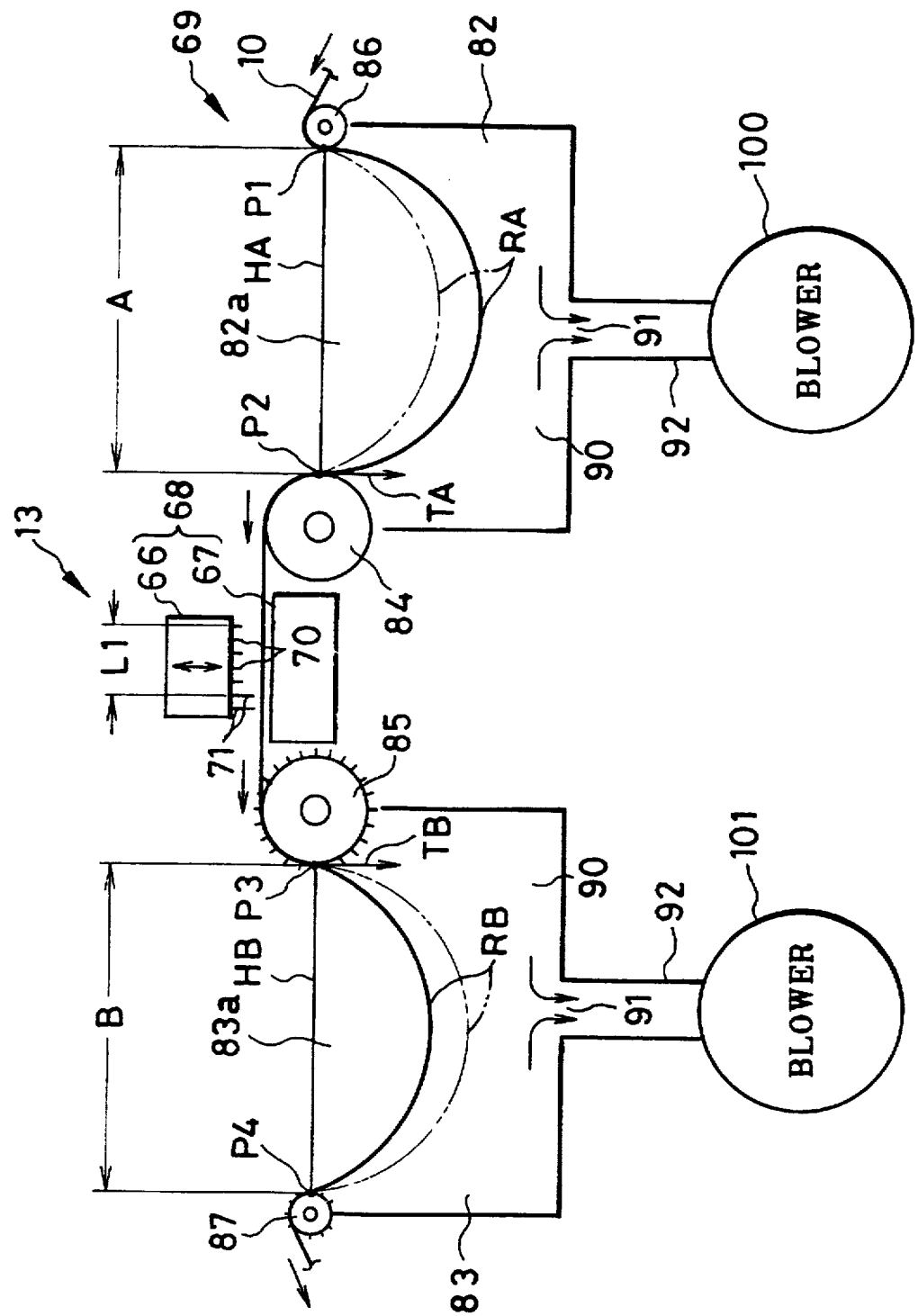
FIG. 6 is an explanatory view illustrating another preferred perforator apparatus including two blowers.
Figure 7:
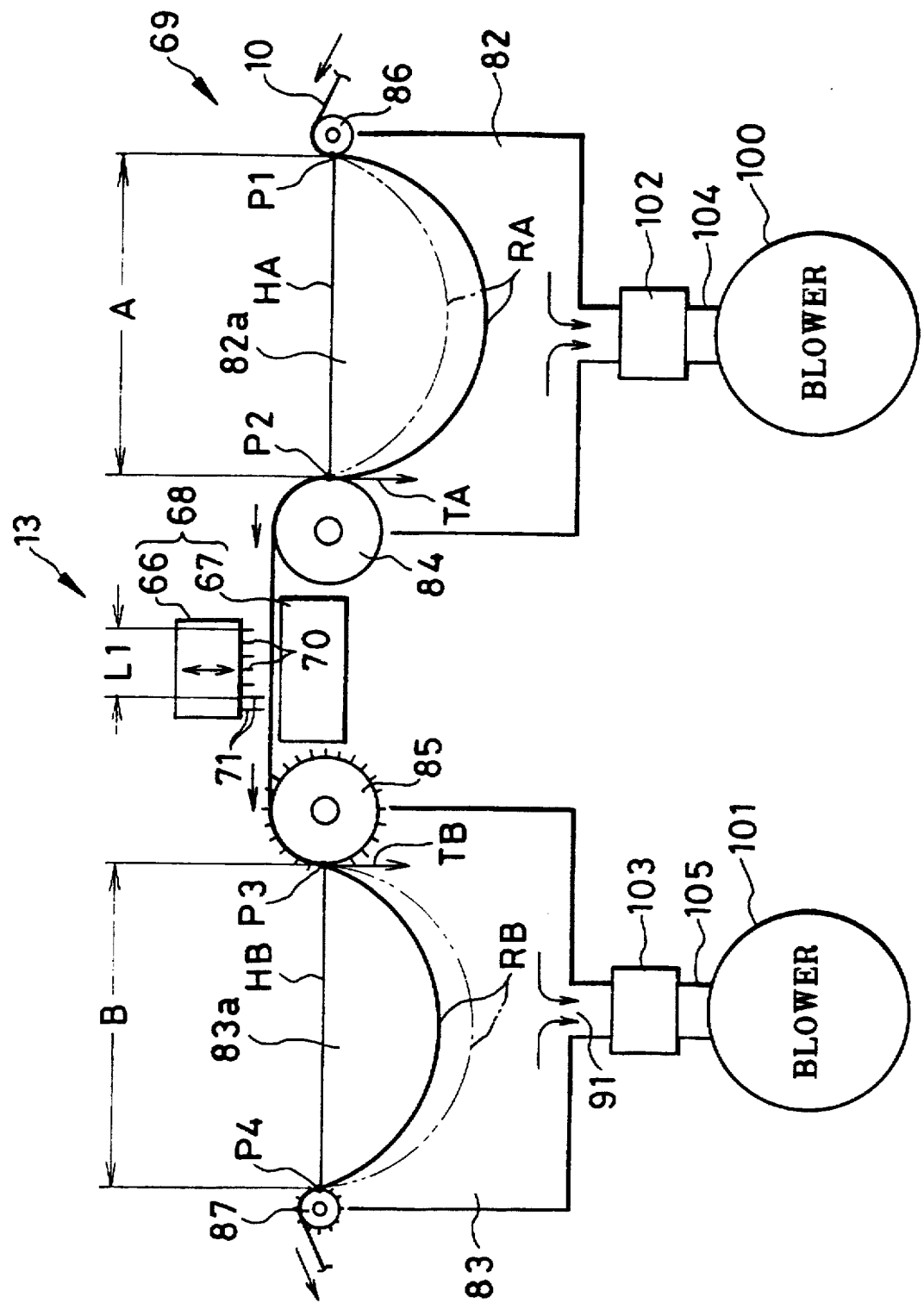
FIG. 7 is an explanatory view illustrating still another preferred perforator apparatus including valves with the blowers.

In FIG. 2, the suction chambers 82 and 83 are connected through the connecting duct 90 to the blower 93, which sucks air of the suction chambers 82 and 83 for applying tension to the continuous photo film 10. Alternatively in FIG. 6, two separate blowers 100 and 101 may be used in connection respectively with the suction chambers 82 and 83 for separate control of air suction. Another preferred embodiment is depicted in FIG. 7, where a first mechanical valve 102 is connected between the blower 100 and the first suction chamber 82, and a second mechanical valve 103 is connected between the blower 101 and the second suction chamber 83. Open areas of ducts 104 and 105 are changed respectively by the first and second valves 102 and 103. It is possible to stabilize the suction in the suction chambers 82 and 83, because the pressure in the suction can be finely regulated and kept from changing. More preferably, changes in the pressure of the suction are previously obtained by experimental operations. Indexing devices (not shown) are used in connection to the motor 76 of FIG. 3, for changing openness of the first and second valves 102 and 103. In FIGS. 6 and 7, elements similar to those in FIG. 2 are designated with identical reference numerals.

Of course the first and second valves 102 and 103 can be used in connection with the single blower 93.

Note that the suction chambers 82 and 83 in FIG. 2 are interconnected. But the suction chambers 82 and 83 may be individually connected to the single blower 93 without direct connection between the suction chambers 82 and 83.

Thus the changes in the pressure in the suction chambers 82 and 83 are suppressed even when the speed in the intermittent conveyance is heightened. The precision in stopping the continuous photo film 10 is kept from being lowered. Specifically, the intermittent conveyance causes the free loops RA and RB to move up and down in the suction chambers 82 and 83. When the speed of the conveyance is heightened, the vertical movement of the free loops RA and RB becomes quicker, to fluctuate the pressure in the suction chambers 82 and 83. The tension TA in the first suction chamber 82 is greater when the conveyance is accelerated, and is smaller when the conveyance is decelerated. The rate of the change is greater according to greatness of the conveying speed. If the conveying speed is over a certain value, the tension applied to the photo film becomes zero (0). As the precision in stopping the intermittent conveyance is lowered to lower the precision in the perforating operation. However, the construction of FIGS. 6 and 7 makes it possible to raise the speed of the perforating operation, because the changes in the pressure in the suction chambers 82 and 83 are suppressed.

With the speed of the perforator apparatus 13 being heightened, the piston crank movement of the punch 66 in the vertical direction comes to have a high speed, which is involved with remarkably great force of inertia. If the perforator apparatus 13 is installed in a building and on a second floor or higher having a low strength, there occurs great floor vibration, which seriously influences durability of the floor or the environment about operators. In the above embodiment, a double-axle balancer system is used for preventing the floor vibration. Also a single-axle balancer system or a counter weight system can be used for preventing vibration in the vertical direction and also in the horizontal direction. In the counter weight system, a single eccentric ring as eccentric load is used, and rotated in synchronism with a pressing movement, so that a combined force including the force of inertia of the pressing movement and the force of inertia of the eccentric rings in the vertical direction is kept as zero (0). In the single-axle balancer system, a plurality of the eccentric rings are used, and rotated in synchronism with the pressing movement. The combined force including the force of inertia of the pressing movement and the force of inertia of the eccentric rings in the vertical direction is kept as zero (0). The combined force of inertia of the eccentric rings in the horizontal direction is kept as zero (0). Positions and rotational directions of the eccentric rings are determined in consideration of the combined force.

In the above embodiments, the photo film is 35 mm photo film. Alternatively photo film of the IX240 type according to the Advanced Photo System (trademark) may be perforated in the present invention. Other continuous belt-like material may also perforated in the present invention.

In the above embodiment, the free loops RA and RB are approximated as semi-circular and are actually catenaries. In the present invention, it should be understood that centers of the free loops RA and RB as catenaries are located not lower than loop ends by a distance half as long as the length HA between the first pass roller 86 and the feed roller 84 and the length HB between the sprocket roller 85 and the second pass roller 87.

A preferred embodiment of a photo film working/securing apparatus and method is hereinafter described with reference to FIGS. 8–18. Elements similar to those of the above embodiments are referred to with identical reference numerals.

Figure 8:
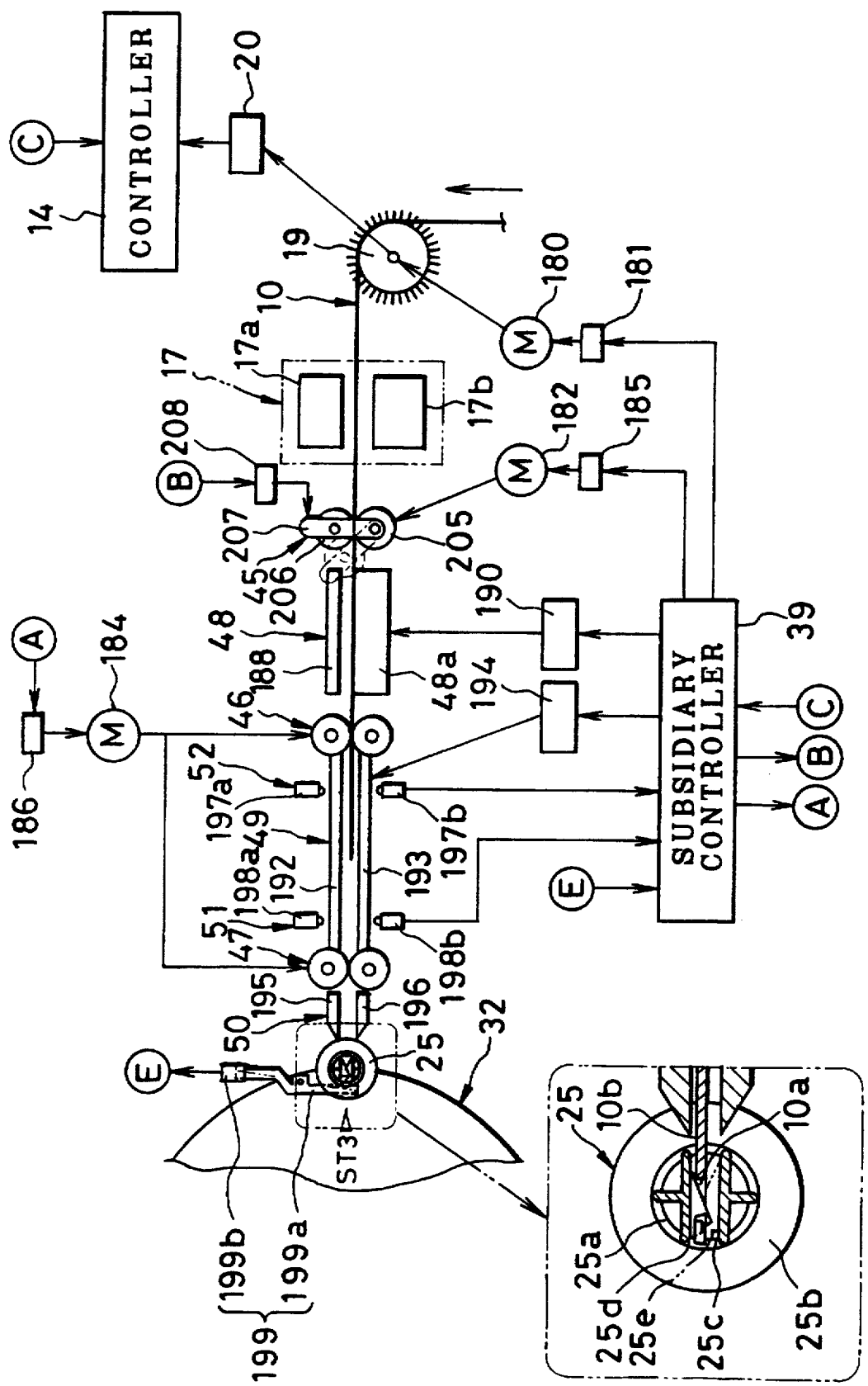
FIG. 8 is an explanatory view in elevation, illustrating a photo film working/securing apparatus included in the cassette manufacturing system.

In a left portion of FIG. 8, the spool 25 is illustrated in detail The spool 25 includes a spool core 25a and a pair of flanges 25b all of which are formed integrally therewith In the spool core 25a, there are formed a slot 25c and a end retainer 25d. The spool slot 25c receives insertion of the front end 10b of the continuous photo film 10. The end retainer 25d includes two retainer hooks The continuous photo film 10 has two retainer holes 10a formed therein The retainer holes 10a are retained on the end retainer 25d. Between the hooks of the end retainer 25d, preventing ridges 25e are located, and press the front end 10b toward the hooks to prevent the retainer holes 10a from being disengaged from the end retainer 25d.

In FIG. 8, the photo film inserter 34 includes the rear conveyor unit 19, the front conveyor unit 45, the first advance roller set 46, the second advance roller set 47, the rear support unit 48, the front support unit 49 and the insert guide 50. The rear conveyor unit 19 is disposed on an upstream side of the trimmer unit 17, and also used as a downstream sprocket roller of the dot printer 16. The front conveyor unit 45 is disposed on an upstream side of the trimmer unit 17.

The rear conveyor unit 19 is rotated by a rear conveyor motor 180. The rear conveyor motor 180 is controlled for rotation via a driver 181 by the subsidiary controller 39. The subsidiary controller 39 determines a conveying amount according to information of a photo film strip length from the controller 14. The front conveyor unit 45 is rotated by a front conveyor motor 182. The advance roller sets 46 and 47 are controlled for rotation via a timing belt 183 by an advancing motor 184, and are rotated at an equal speed. Both the motors 182 and 184 are controlled via drivers 185 and 186 by the subsidiary controller 39.

Figure 9:
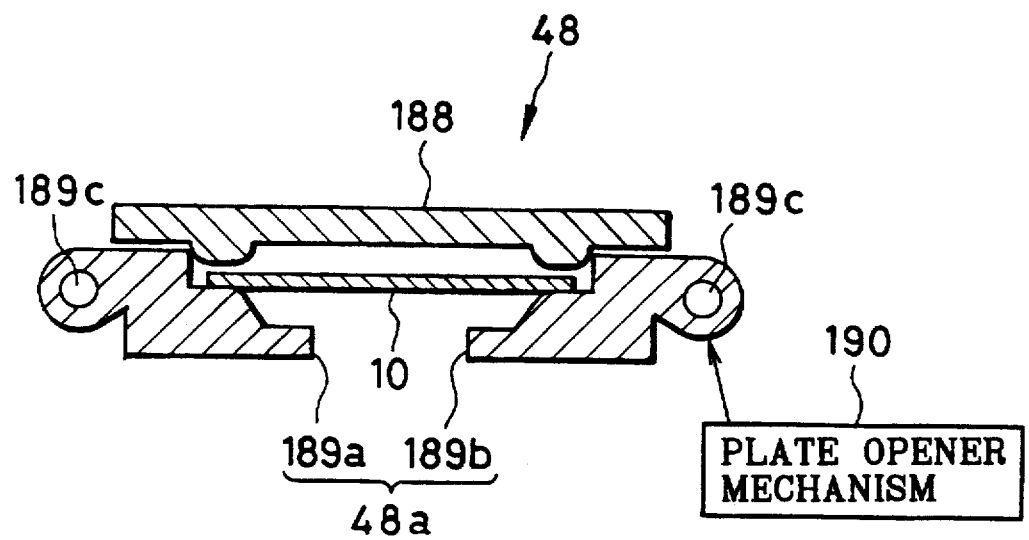
FIG. 9 is a cross section illustrating a rear support unit in a closed position.
Figure 10:
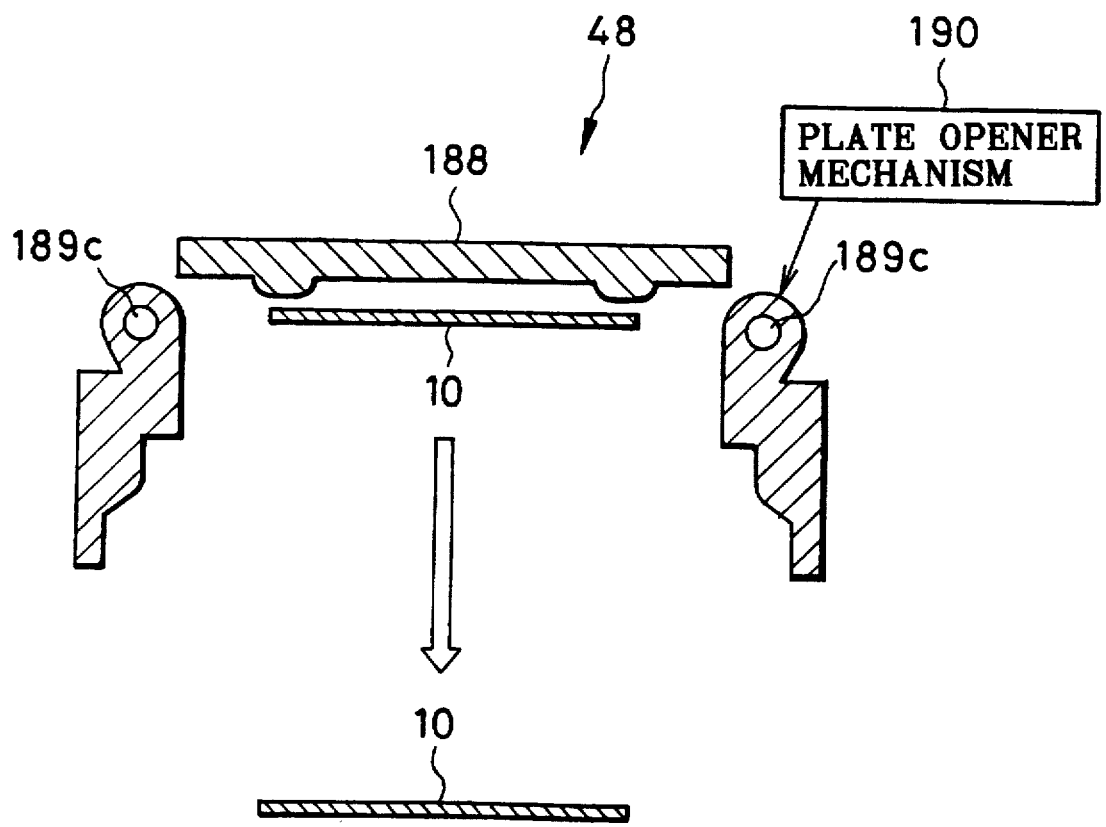
FIG. 10 is a cross section illustrating the rear support unit in an open position.

The rear support unit 48 is disposed between the front conveyor unit 45 and the first advance roller set 46, and includes a stationary guide plate 188 and the rear support plate set 48a. In FIG. 9, the rear support plate set 48a includes a pair of rear support plates 189a and 189b, each of which is supported about a shaft 189c oriented in a photo film conveying direction. The rear support plates 189a and 189b are swung respectively by a plate opener mechanism 190 between closed and open positions. In FIG. 9, the rear support plates 189a and 189b are in the closed position and have a horizontal orientation. In FIG. 10, the rear support plates 189a and 189b are in the open position and have a vertical orientation, to open the loop chamber 53 in a manner of doors. In FIG. 10, the continuous photo film 10 is looped inside the loop chamber 53, Thus the rear support plates 189a and 189b in the open position operate as a reservoir.

Figure 11:
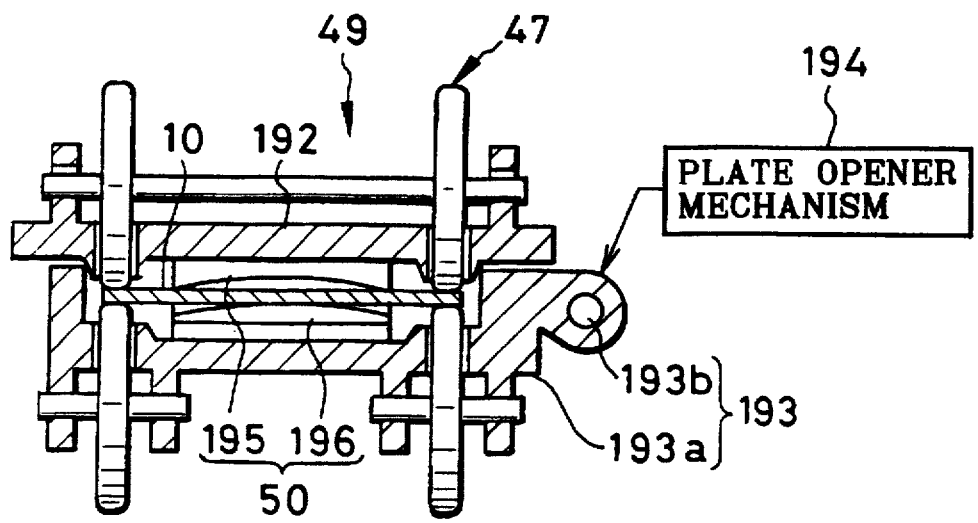
FIG. 11 is a cross section illustrating a front support unit in a closed position.
Figure 12:
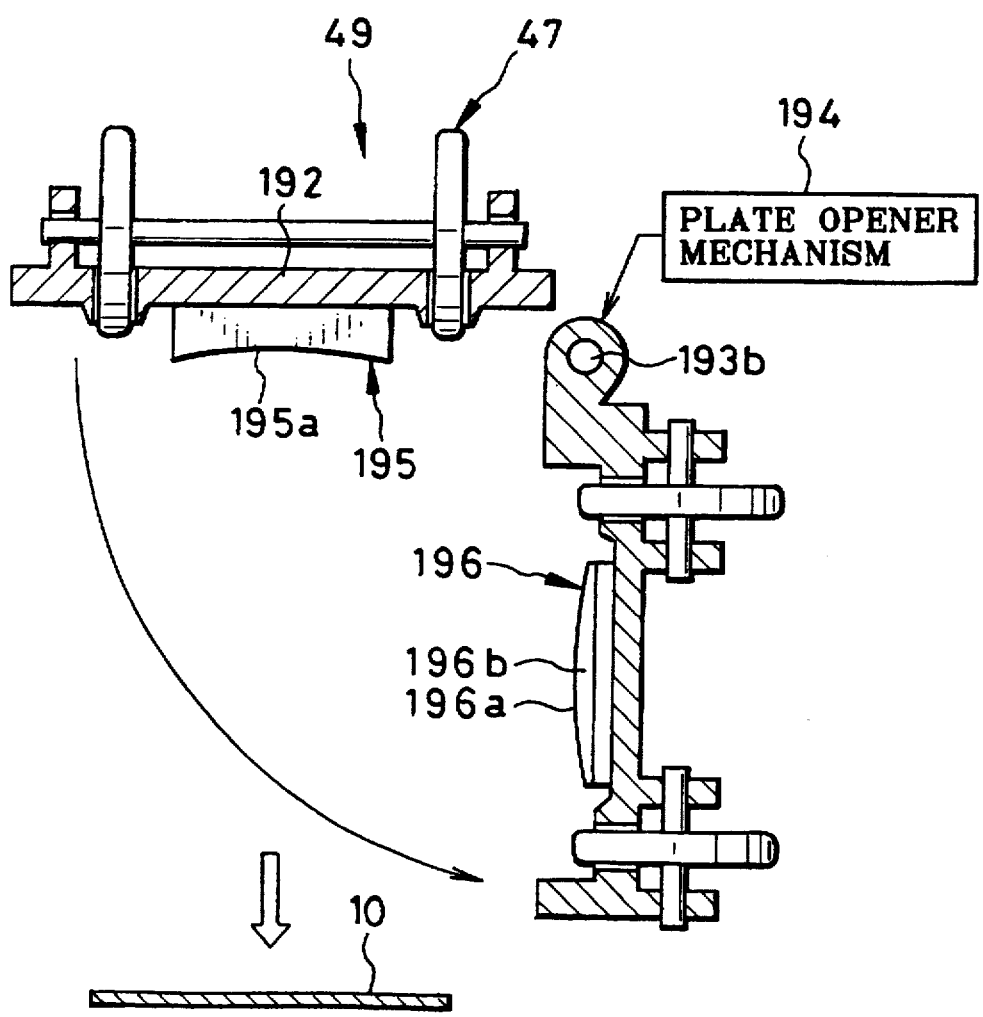
FIG. 12 is a cross section illustrating the front support unit in an open position.

The front support unit 49 is disposed between the advance roller sets 46 and 47, and includes a stationary cover plate 192 and a swingable front support plate 193. In FIGS. 11 and 12, the front support plate 193 includes a plate portion 193a and a shaft 193b, and is swung by a plate opener mechanism 194 between a horizontal closed position of FIG. 11 and a vertical open position of FIG. 12.

Figure 13:
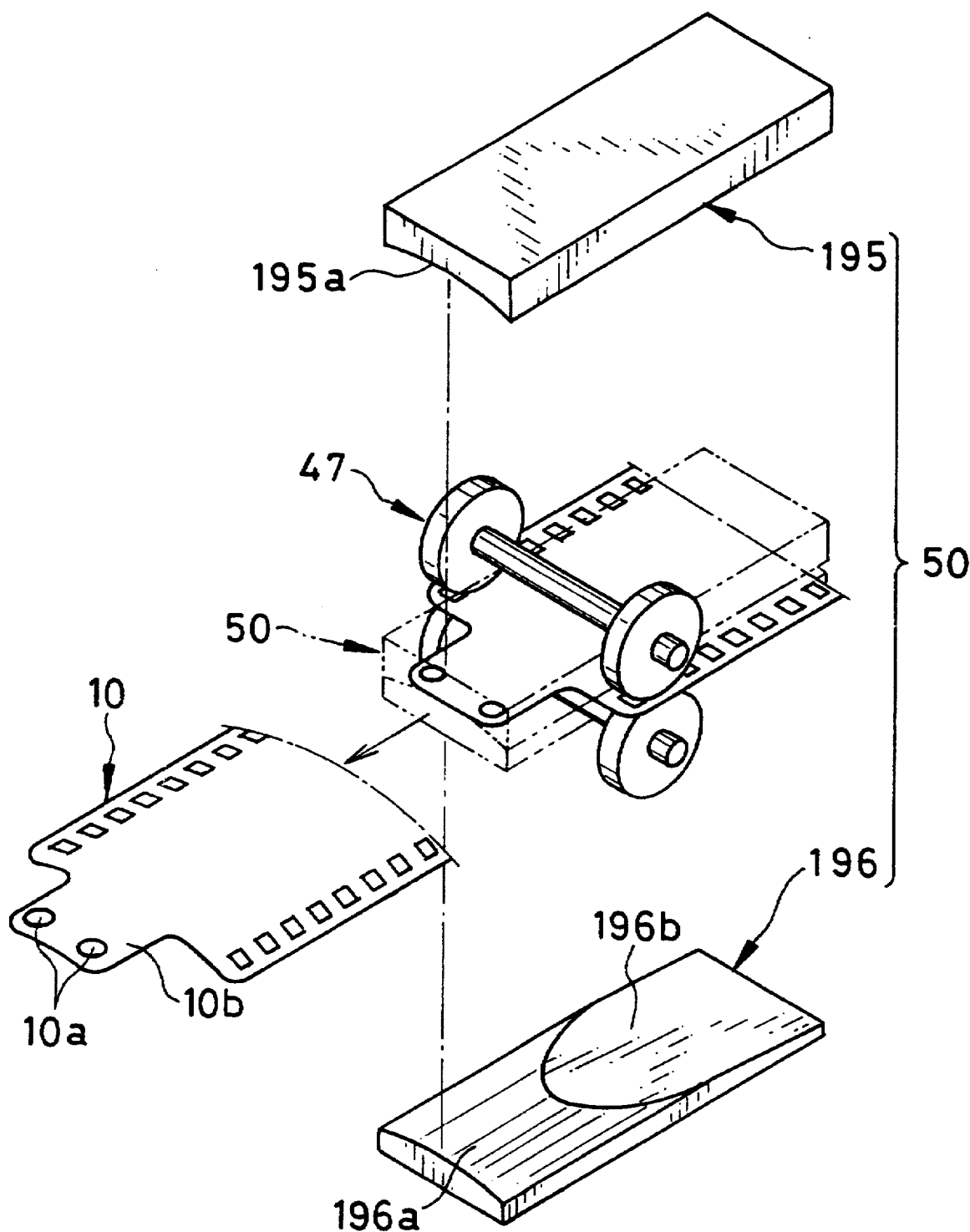
FIG. 13 is an exploded perspective illustrating an insert guide with a photo film front end.

In FIG. 8, the insert guide 50 is disposed to guide the center of the continuous photo film 10 on the downstream side of the front support unit 49. In FIG. 13, the insert guide 50 includes an upper access portion 195 and a lower access portion 196. A bottom of the upper access portion 195 has a concave portion 195a. A top of the lower access portion 196 has a convex portion 196a. The lower access portion 196 has an inclined face 196b on the side nearer to the front support unit 49. The inclined face 196b guides the front end 10b of the continuous photo film 10 from the front support unit 49 smoothly toward the convex portion 196a. The front end 10b is passed between the concave and convex portions 195a and 196a, and curved in an arch shape with respect to its width direction while in the course of insertion into the spool slot 25c. The combination of the front support unit 49, the insert guide 50, the first advance roller set 46 and the second advance roller set 47 constitutes the photo film inserter 34. Note that, although the insert guide 50 is mounted on the front support unit 49, the insert guide 50 may be disposed in a manner separate from the front support unit 49. The lower access portion 196 may be provided with an additional mechanism similar to the plate opener mechanism 194, and may be shifted between closed and open positions in a manner similar to the front support plate 193 of the front support unit 49.

In FIG. 8, the front support unit 49 has the first and second passage sensors 51 and 52. The second passage sensor 52 is constituted by an infrared beam projector 197a and an infrared beam receiver 197b as photo sensor. The first passage sensor 51 is constituted by an infrared beam projector 198a and an infrared beam receiver 198b as photo sensor. When the continuous photo film 10 exists at the two passage sensors 51 and 52, an output of the two passage sensors 51 and 52 goes "Low" and is sent to the subsidiary controller 39. When the continuous photo film 10 does not exist at the two passage sensors 51 and 52, the output of the two passage sensors 51 and 52 goes "High" and is sent to the subsidiary controller 39. When each output of the two passage sensors 51 and 52 turns from "High" to "Low", the subsidiary controller 39 recognizes movement of the distal end of the front end 10b past one of the two passage sensors 51 and 52.

When the spool 25 is set in Station ST3, this state is detected by the subsidiary controller 39, which rotates the motors 180, 182 and 184. The subsidiary controller 39 controls the motors 180, 182 and 184 to set their peripheral rotational speeds in such a manner that the conveying speed increases in the downstream direction at a predetermined drawing rate. The drawing rate is for example 0.1–5%. This is for the purpose of applying tension to the continuous photo film 10 between them. Note that it is possible to start the conveyance between an indexing rotational operation between Stations ST2 and ST3, to shorten the cycle time.

Then the subsidiary controller 39 detects passage of the front end lob of the continuous photo film 10 according to a signal from the second passage sensor 52. In response the subsidiary controller 39 shifts the rear support plate set 48a from the closed position of FIG. 9 to the open position of FIG. 10.

When the first passage sensor 51 detects the front end 10b of the continuous photo film 10, the subsidiary controller 39 reduces speed of the advancing motor 184 to convey the continuous photo film 10 at the inserting speed V2. In FIG. 13, the front end 10b is conveyed past the insert guide 50, the concave and convex portions 195a and 196a of the access portions 195 and 196 keep the continuous photo film 10 curved in the arch shape. The front end 10b of FIG. 8 is inserted into the spool slot 25c of the spool 25 while kept curved. Accordingly the front end 10b is reliably inserted into the spool slot 25c without being bent. The retainer holes 10a are retained on the end retainer 25d.

When the front end 10b is fully inserted in the slot in the spool 25, a securing sensor 199 detects the front end 10b.

The securing sensor 199 includes a detector lever 199a and an infrared beam projector/receiver 199b. When the insertion is finished, the detector lever 199a is shifted. The infrared beam projector/receiver 199b detects the shift of the detector lever 199a, and responsively generates the detecting signal of finish of the insertion. The detecting signal from the securing sensor 199 is sent to the subsidiary controller 39, which recognizes the finish of the insertion upon the detecting signal. The subsidiary controller 39 stops the advancing motor 184, and moves the front support plate 193 of the front support unit 49 from the closed position to the open position. Thus the loop chamber 53 (See FIG. 1) is opened under the front support unit 49.

When the advancing motor 184 stops rotating, the rear conveyor unit 19 and the front conveyor unit 45 still rotate to convey the continuous photo film 10 by the predetermined length. The continuous photo film 10 is looped in the loop chamber 53 with a gradual increase in the size of the loop. When it is detected according to a signal from the rotary encoder 20 that the rear conveyor unit 19 has conveyed the continuous photo film 10 by the predetermined length, then the motors 180 and 182 are stopped. Then the trimmer unit 17 is operated to produce the photo filmstrip 23 by cutting the continuous photo film 10. After the trimmer unit 17 is operated, the front conveyor motor 182 is rotated for predetermined time. The front conveyor unit 45 lets off the rear end 23a downstream toward the loop chamber 53.

Figure 14:
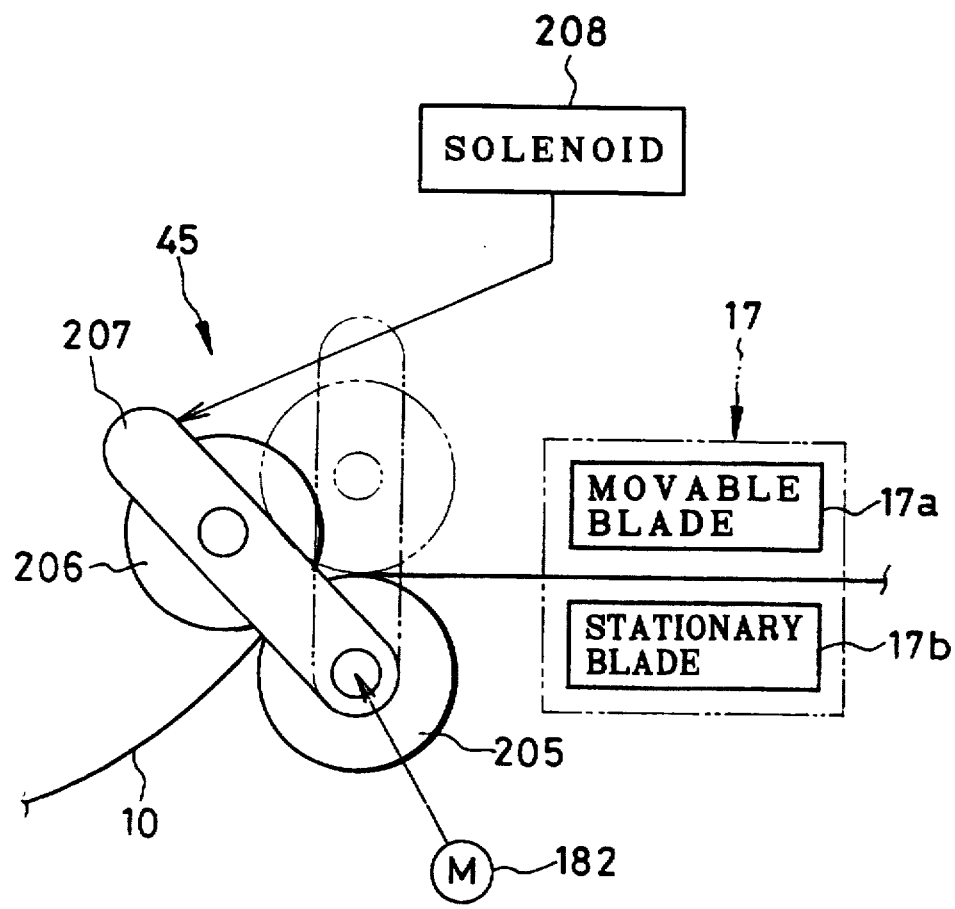
FIG. 14 is an explanatory view illustrating a front conveyor unit with a conveyor shifter.
Figure 16:
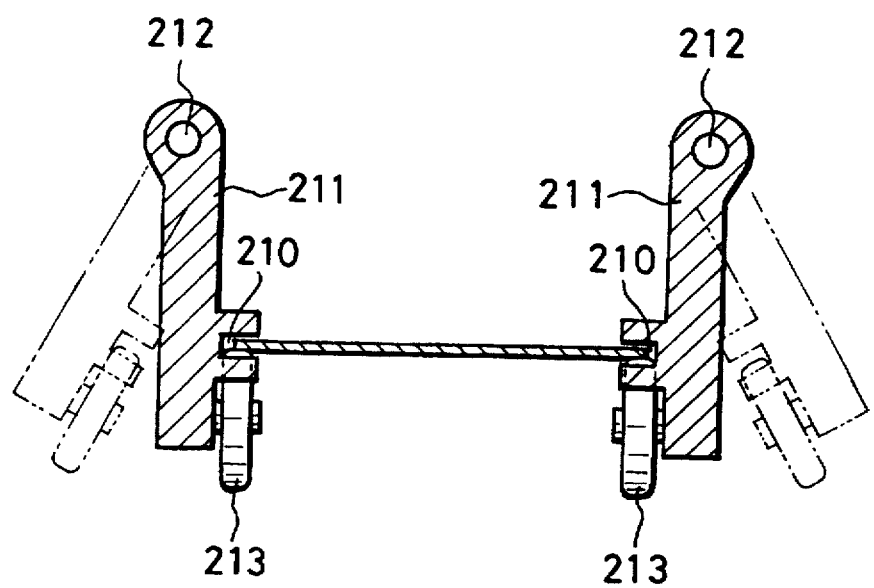
FIG. 16 is a cross section illustrating another preferred structure for the front support unit or rear support unit.
Figure 15:
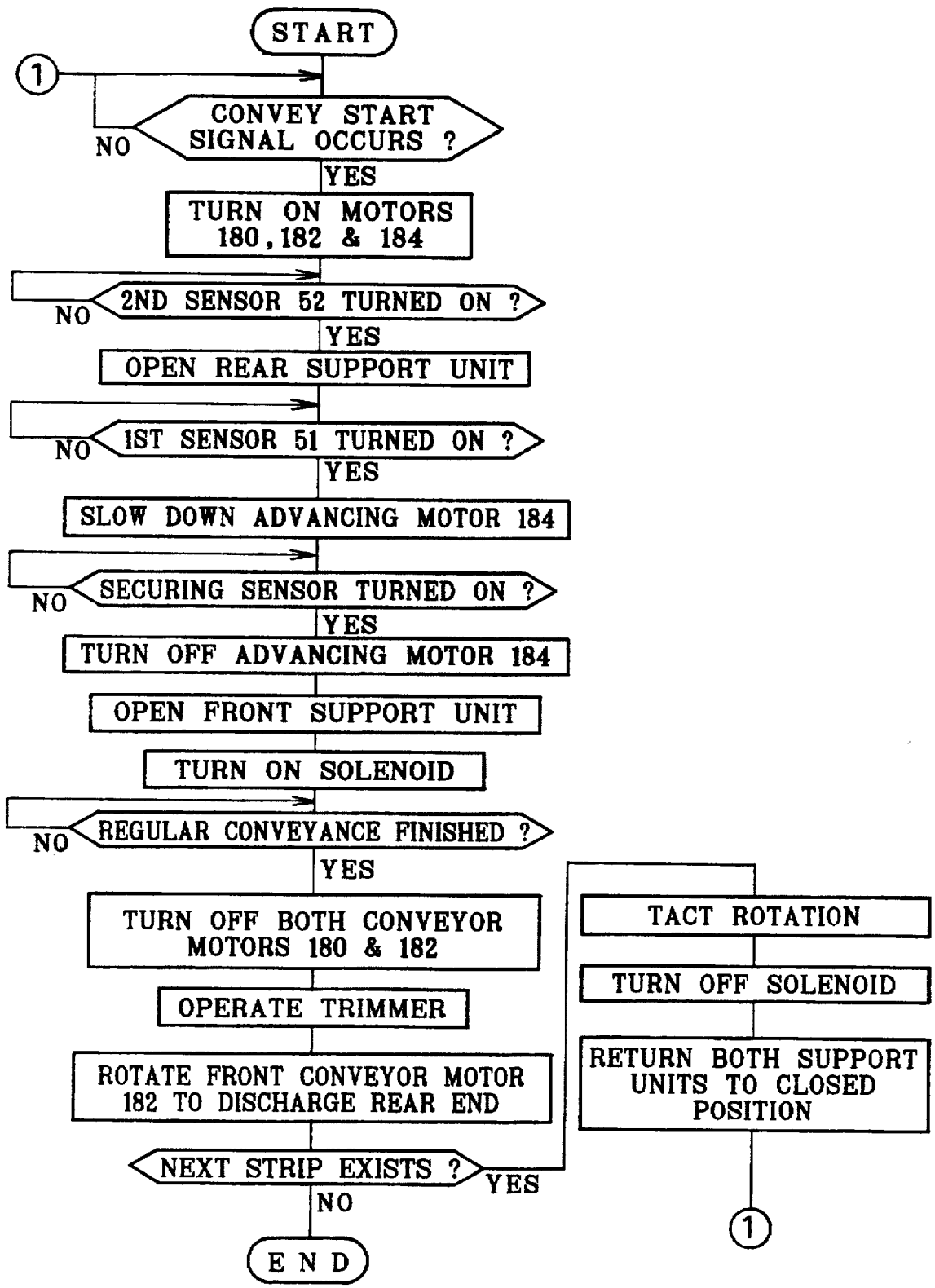
FIG. 15 is a flow chart illustrating an operation of the photo film working/securing apparatus.

In FIG. 14, the front conveyor unit 45 includes a first conveyor roller 205 and a second conveyor roller 206. The first conveyor roller 205 is rotated by the front conveyor front conveyor motor 182. The second conveyor roller 206 is supported in a rotatable manner on an arm 207, which is included in a conveyor shifter. The arm 207 is swingable in a range of 45 degrees about an axis common to the first conveyor roller 205. A solenoid 208, included in the roller shifter, is associated with the arm 207. The solenoid 208 is controlled by the subsidiary controller 39, and turned on in the course of initially forming the free loop of the continuous photo film 10 upon reducing the speed of the advancing motor 184, to swing the arm 207 by 45 degrees in the counter-clockwise direction, or away from the trimmer unit 17. Thus the direction of forming a loop is restricted. This prevents the continuous photo film 10 from being looped upwards, and prevents its upper emulsion surface from contacting any part of the apparatus. Of course this prevents a photo film loop from changing from an upward loop to a downward loop, so as to stabilize load to conveyance. Note that the arm 207 can be swung by an angle different from 45 degrees. The swinging angle can be determined suitably for a looping shape or the size of the loop chamber 53. In FIG. 15, a flow of the steps in the method of the present embodiment is depicted.

The operation of the system for manufacturing the photo film cassette 24 is described. A photo film strip length is input through the input device 18. The controller 14 operates the selector 38 according to the information of the photo film strip length, and selects one of the cassette suppliers 60. The controller 14 determines the information to be imprinted and the length by which the continuous photo film 10 should be cut, according to the information of the photo film strip length.

When a system start command is input to the controller 14, a process of working the continuous photo film 10 is started. The continuous photo film 10 from the photo film roll 11 is perforated by the perforator apparatus 13 to have the two trains of perforations at the regular pitch. The side belt printer 15 and the dot printer 16 imprint the belt-shaped information, and information such as a DX code and frame numbers in accordance with the photo film strip length, to one or both of the narrow edge areas of the continuous photo film 10.

In FIG. 8, the rear conveyor unit 19 is rotated by the rear conveyor motor 180. The teeth about the rear conveyor unit 19 is meshed with perforations to convey the continuous photo film 10. When the front end 10b of the continuous photo film 10 moves downstream to the trimmer unit 17, this state is detected by recognizing the predetermined amount of feeding the photo film. Then the continuous photo film 10 is stopped. The front end 10b of the continuous photo film 10 is worked by the trimmer unit 17, which also forms the retainer holes 10a.

In FIG. 1, a wind start signal from the controller 14 causes the subsidiary controller 39 to drive the actuator 44, which opens/closes the shutter 31. The one spool 25 is removed from the stacker 33, and is placed in one of the spool holders 42 positioned in Station ST1. Then the subsidiary controller 39 causes the indexing device 41 to rotate the spool turret 32 in a manner of the tact system. Then the one of the spool holders 42 with the spool 25 is set in Station ST2. Another empty one of the spool holders 42 is set in Station ST1, and is loaded with another spool 25 by the shutter 31. In Station ST2, a motor 43 is controlled by the subsidiary controller 39 and rotated by a driver 43a, so that the spool drive shaft orients the spool slot 25c of the spool 25 in a radial direction of the spool turret 32.

When the one of the spool holders 42 with the spool is positioned in Station ST3, the subsidiary controller 39 causes the motors 180, 182 and 184 to rotate as illustrated in FIG. 8. The rear conveyor unit 19, the front conveyor unit 45, the first advance roller set 46 and the second advance roller set 47 are rotated to convey the continuous photo film 10 to the spool 25. The peripheral rotational speeds of the front conveyor unit 45, the first advance roller set 46 and the second advance roller set 47 are set with the predetermined drawing rates, so that the continuous photo film 10 are conveyed at the conveying speed increasing in the downstream direction. The continuous photo film 10 has enough tension while conveyed.

When the second passage sensor 52 detects the passage of the front end 10b, then the subsidiary controller 39 swings the rear support plate set 48a of the rear support unit 48 to open the loop chamber 53 under the rear support unit 48. When the first passage sensor 51 detects the passage of the front end 10b, then the subsidiary controller 39 comes to drive the advancing motor 184 at the reduced speed to cause the advance roller sets 46 and 47 to convey the continuous photo film 10 at the inserting speed V2. A free loop of the continuous photo film 10 is gradually formed in the loop chamber 53.

It is to be noted that the front conveyor unit 45 is shifted with an inclination by cooperation of the arm 207 and the solenoid 208 at a predetermined point of time. This point of time may be predetermined suitably as desired, at earliest the time of the reach of the front end 10b to the first advance roller set 46, and at latest the time of the detection of the front end 10b at the first passage sensor 51.

In FIG. 13, the front end 10b when passed in the insert guide 50 is curled forcibly by the concave and convex portions 195a and 196a in its width direction, and is inserted into the spool slot 25c in the spool 25 in the curled state as illustrated in FIG. 8. Even the front end 10b has resistance against the insertion into the spool 25, the curled shape of the front end 10b has high rigidity resistant to flexure. The continuous photo film 10 can be inserted without such failure as being bent by a portion of the spool 25.

When the front end 10b projects toward the opposite side in the spool slot 25c of the spool 25, the securing sensor 199 detects the front end 10b. The subsidiary controller 39 recognizes the finish of the insertion according to a signal from the securing sensor 199, to stop rotation of the advancing motor 184. The front support plate 193 of the front support unit 49 is set to the open position of FIG. 12 under the closed position of FIG. 11. The lower access portion 196 on the front support plate 193 is set in the open position, to open the loop chamber 53.

The controller 14 counts pulses from the rotary encoder 20, and detects the finish of one cycle of the intermittent conveyance when the number of the pulses comes up to one corresponding to the photo film strip length. The controller 14 sends the subsidiary controller 39 a finish signal The subsidiary controller 39 stops the motors 180 and 182 provisionally upon the finish signal. Then the controller 14 operates the trimmer unit 17 to cut the photo filmstrip 23 from the continuous photo film 10. The front end lob and the rear end 23a are formed by the trimmer unit 17. The subsidiary controller 39 causes the front conveyor motor 182 to rotate by a predetermined amount, for the front conveyor unit 45 to let off the rear end 23a toward the loop chamber 53 away from the trimmer unit 17.

The subsidiary controller 39 causes the indexing device 41 to rotate the spool turret 32 in a manner of the tact system. Then the subsidiary controller 39 turns off the solenoid 208, to direct the continuous photo film 10 horizontally straight without forcibly looping it downwards. The rear support plate set 48a of the rear support unit 48 and the front support plate 193 of the front support unit 49 are returned from the open position to the closed position.

In Station ST4, the subsidiary controller 39 rotates the spool 25 with the front end 10b, to wind the photo filmstrip 23 from the loop chamber 53 about the spool 25. In Station ST5, the subsidiary controller 39 causes the spool transfer unit 36 to remove the spool 25 with a roll of the photo filmstrip 23, and to transfer it to the cassette assembly device 37.

The spool 25 with the roll of the photo filmstrip 23 is inserted in one of the tubular bodies 62 by the cassette assembly device 37, which then fits two of the caps 64 on the one tubular body 62 with the spool 25 kept rotatably obtain the photo film cassette 24. The photo film cassette 24 has the rear end 23a or the photo film leader externally protruded by a length irrespective of the photo film strip length. The controller 14 and the subsidiary controller 39 operate in synchronism, for the operations of working the photo film, winding it about the spool 25, and assembly of the photo film cassette.

To change the photo film strip length, information of a new photo film strip length is input through the input device 18. The selector 38 changes over the cassette suppliers 60 according to the new photo film strip length. The side printing information is changed. Also the length by which the continuous photo film is cut is changed. Even with the change in the photo film strip length, the distance from the trimmer unit 17 to the spool 25 is determined shorter than a smallest one of the plural photo film strip lengths. A basic sequence of the front end insertion in the photo film inserter 34 is unchanged irrespective of the strip length. Only the conveying amount of the rear conveyor unit 19 is changed according to the strip length. Consequently it is possible to simplify the control of the photo film winder apparatus adapted to the two or more photo film strip lengths.

A distance D1 between a center of the trimmer unit 17 and a center of the spool 25 is determined in a range of 740 mm or less, in view of a range 740–1800 mm of the photo film strip length. More preferably, the front support unit 49 is required to have a considerably great length according to shortened cycle time. Thus the distance D1 between the center of the trimmer unit 17 and that of the spool 25 can be determined in a range of 500–700 mm. In determining a distance D2 between a center of the first advance roller set 46 and a center of the spool 25, a distance D3 between the first passage sensor 51 and a center of the spool 25, a distance D4 between the two passage sensors 51 and 52, V1, α and V2 are considered, where V1 is the regular conveying speed, a is the decelerating rate, and V2 is the inserting speed. For example, V1, α and V2 are determined as follows:

$V1 = 150$ m/min, $α = 0.1$ sec/(150 m/min), and $V2 = 40$ m/min.

It is assumed that 50 msec is taken after the movement of the front end 10b past the second passage sensor 52 and before the rear support plate set 48a of the rear support unit 48 becomes open enough to be free from the photo film. The photo film is conveyed by 125 mm. Thus the distance D4 between the two passage sensors 51 and 52 must be at least 125 mm. Furthermore the photo film is conveyed by 116 mm in deceleration from the regular conveying speed V1 to the inserting speed V2 at the decelerating rate α. Thus the distance D3 between the first passage sensor 51 and the center of the spool 25 must be at least 116 mm. It is therefore concluded that the distance D5 between the first advance roller set 46 and the second advance roller set 47 or a length D5 of the front support unit 49 is preferably 250 mm when with the above values of V1, α and V2. The distance D1 between the centers of the trimmer unit 17 and the spool 25 is preferably 700 mm, which should be shorter than the minimum of the photo film strip length, and should be considered with the length D5 of the front support unit 49, and should be long for elongating the rear support unit 48 for stability.

In Station ST3, the front end 10b is inserted into the spool 25. In Station ST4, the photo filmstrip 23 is wound about the spool 25. Alternatively it is possible to wind the photo filmstrip 23 about the spool 25 in Station ST3 at least partially immediately after the insertion. With this alternative structure, the front support unit 49 does not require an openable construction, and can be stationary. In the above embodiment, the photo filmstrip 23 in Station ST4 is wound fully about the spool 25. Alternatively it is possible to use Station ST4 for initially winding the photo filmstrip 23, and to use a new Station next to the ST4 for finally winding the photo filmstrip 23. With this structure, amounts of winding operations in Station ST4 and next new station can be determined suitably in such a manner as to shorten the cycle time. The spool turret 32 has the six spool holders, but may have five or less, or seven or more spool holders as desired In the above embodiment, Station ST5 is used for exiting of the spool 25. Station ST1 is used for supply of the spool 25. It is also possible to use a single station in which Stations ST1 and ST5 are unified for exiting and supply of the spool 25.

In the above embodiment, the rear support unit 48 is constituted by the stationary guide plate 188 and the rear support plate set 48a; with the front support unit 49 constituted by the stationary cover plate 192 and the front support plate 193. Alternatively first and second support plates 211 of FIG. 16 can be used instead of at least one of the rear support unit 48 and the front support unit 490 The support plates 211 have swingable support grooves 210 as front or rear support unit, which guide edges of the continuous photo film 10. Each of the support plates 211 is supported on a shaft 212 in a manner swingable thereabout. When the support plates 211 have positions indicated by the solid line, the support plates 211 guide the continuous photo film 10. When the support plates 211 have positions indicated by the phantom line, the support plates 211 are open and keep the continuous photo film 10 free from it. It is to be noted that guide rollers 213 can be disposed to project into the swingable support grooves 210 at a suitable pitch.

It is also noted that, instead of the combined use of the controller 14 and the subsidiary controller 39, a single controller may used in an inclusive manner of the controller 14 and the subsidiary controller 39.

Figure 18:
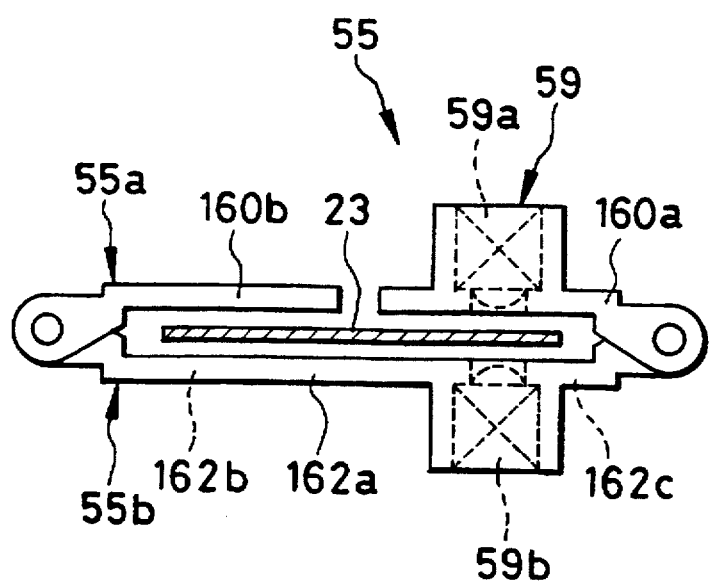
FIG. 18 is a bottom view illustrating the photo film guide in a closed position.

In Station ST4, the photo film guide 55 and the photo film sensors 58 and 59 are disposed. The motor control unit 57 receives a rear end detecting signal from the photo film sensor 58, and responsively changes rotation of the motor 54 from the high speed to the low speed. The motor control unit 57 receives a rear end detecting signal from the photo film sensor 59, and responsively stops the rotation of the motor 54. In FIG. 18, the photo film sensor 59 consists of a combination of an infrared beam projector 59a and an infrared beam receiver 59b as photo sensor. The photo film sensor 58 also consists of a combination of an infrared beam projector (not shown) and an infrared beam receiver (not shown) as photo sensor.

Figure 17:
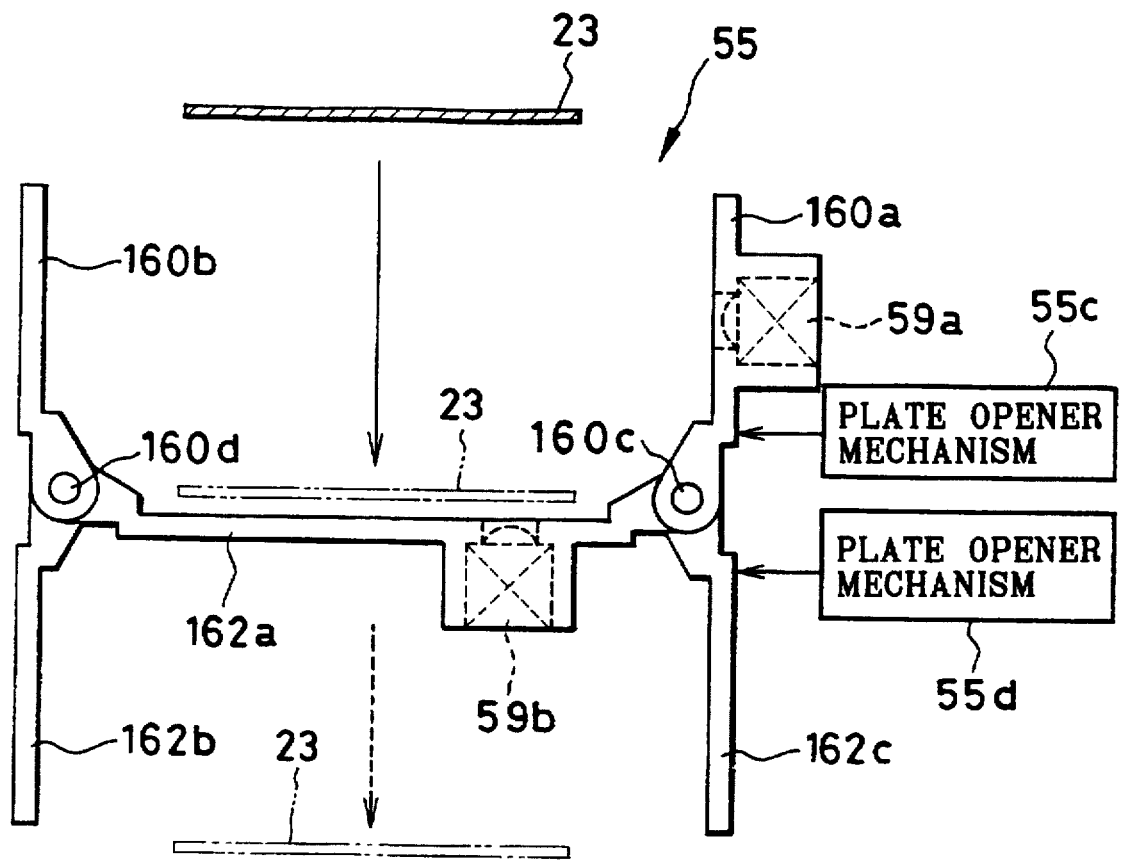
FIG. 17 is a bottom view illustrating a photo film guide disposed at a photo film winding station when the photo film guide is in an open position.

In FIGS. 17 and 18, the guide plate 55a nearer to the spool turret 32 in Station ST3 is constituted by plate segments 160a and 160b. The plate segments 160a and 160b are swingable about respective shafts 160c and 160d oriented in the radial direction of the spool turret 32. The plate segments 160a and 160b are opened and closed respectively when swung to the open position and the closed position by a plate opener mechanism 55c (See FIG. 1). In the open position, the guide plate 55b receives the photo filmstrip 23 from Station ST3.

The guide plate 55b is constituted by a stationary plate segment 162a and movable plate segments 162b and 162c. Among those, the movable plate segments 162b and 162c support the rear end 23a being located in the photo film guide 55. The stationary plate segment 162a is located outside the movable plate segments 162b and 162c with respect to arrangement about the spool turret 32. The movable plate segments 162b and 162c are opened and closed respectively when swung to the open position and the closed position by a plate opener mechanism 55d (See FIG. 1). In the open position, the guide plate 55b allows the rear end 23a to move away from Station ST4 toward Station ST5.

Before the spool turret 32 rotates according to the tact system, the subsidiary controller 39 effects a control to move the movable plate segments 162b and 162c to the open position, and moves the guide plate 55a to the open position, at the same time as or after moving the movable plate segments 162b and 162c to the open position. After the spool turret 32 rotates in a manner of the tact system, the movable plate segments 162b and 162c and the guide plate 55a are returned to the closed position.

In the above embodiments, the second conveyor roller 206 of the front conveyor unit 45 is swung about the first conveyor roller 205 to orient the loop of the photo film. Alternatively the first conveyor roller 205 of the front conveyor unit 45 may be swung about the second conveyor roller 206 in an upstream direction. In the above embodiment, the photo film is a 35mm type. Alternatively the photo film of the present invention may be an IX240 type referred to as a type according to the Advanced Photo System (trademark).

In the above embodiments, the end retainer 25d is used for retaining the front end 10b by engagement with the retainer holes 10a. It is also possible in the present invention to use other methods of retaining the retainer holes 10a to the spool by pressing the retainer holes 10a to the spool. For example, a spool core may be pre-coated with adhesive agent, to which the retainer holes 10a may be pressed by an apparatus constructed like the above-described inserter.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A perforator apparatus for continuous material being conveyed continuously, including a perforator unit having a punch and a die, said perforator unit forming a train of perforations in said continuous material along at least one edge thereof when said continuous material is stopped, said perforator apparatus comprising:

at least one blower for applying suction of air;

a first suction chamber, disposed upstream from said perforator unit, and connected to said blower, said continuous material being extended through said first suction chamber in a looped manner;

a second suction chamber, disposed downstream from said perforator unit, and connected to said blower, said continuous material being extended through said second suction chamber in a looped manner, said second suction chamber cooperating with said first suction chamber for applying tension to said continuous material which passes through said perforator unit;

a feed roller, disposed on a downstream side of said first suction chamber, for supporting said continuous material to convey said continuous material toward said perforator unit;

a first indexing device for rotating said feed roller to cause said feed roller intermittently to convey said continuous material by a predetermined punching length;

a sprocket roller, disposed on an upstream side of said second suction chamber, engaged with said perforations of said continuous material for supporting said continuous material to convey said continuous material toward said second suction chamber; and a second indexing device for rotating said sprocket roller in a synchronized manner with said feed roller, intermittently to convey said continuous material by said predetermined punching length.

2. A perforator apparatus for continuous material being conveyed continuously, including a perforator unit having a punch and a die, said perforator unit forming a train of perforations in said continuous material along at least one edge thereof when said continuous material is stopped, said perforator apparatus comprising;

a first suction chamber, disposed upstream from said perforator unit, a first length of said continuous material being extended through said first suction chamber thereby forming a first loop therein;

a second suction chamber, disposed downstream from said perforator unit, a second length of said continuous material being extended through said second suction chamber thereby forming a second loop therein;

at least one blower, connected to said first and second suction chambers, for applying suction of air, to apply tension to said continuous material which passes through said perforator unit;

a feed roller, disposed on a downstream side of said first suction chamber and upstream of said perforator unit, and a mechanism for operating said feed roller cyclically such that during one cycle said feed roller undergoes a stopping step of stopping for operation of said perforator unit, and a rotating step of conveying said continuous material toward said perforator unit by a predetermined punching length;

a sprocket roller, disposed on an upstream side of said second suction chamber and downstream of said perforator unit, and a mechanism for operating said sprocket roller cyclically such that during said one cycle said sprocket roller undergoes a stopping step of stopping for operation of said perforator unit, and a rotating step of conveying said continuous material from said perforator unit by said predetermined punching length;

a first pass roller, disposed on an upstream side of said first suction chamber, driven for continuously conveying said continuous material by said predetermined punching length during said one cycle, to thereby maintain said first loop in said first suction chamber, wherein said first length is substantially that of an arc of a semi-circle defined between said first pass roller and said feed roller; and a second pass roller, disposed on a downstream side of said second suction chamber, driven for continuously conveying said continuous material by said predetermined punching length during said one cycle, to thereby maintain said second loop in said second suction chamber, wherein said second length is substantially that of an arc of a semi-circle defined between said second pass roller and said sprocket roller.

3. A perforator apparatus as defined in claim 2, wherein said first pass roller is disposed at a first distance from said feed roller; and said second pass roller is disposed at a second distance from said sprocket roller, said second distance being equal to said first distance to form said first and second loops of substantially equal length so as to balance application of said suction to said first and second loops between said first and second suction chambers.

4. A perforator apparatus as defined in claim 3, wherein said punching length is shorter than either of said first and second distances for reducing a change in an amount of said first and second loops.

5. A perforator apparatus as defined in claim 2 or 3, further comprising:

a first indexing device for rotationally controlling said feed roller; and a second indexing device for rotationally controlling said sprocket roller.

6. A perforator apparatus as defined in claim 5, wherein said first suction chamber is connected to said second suction chamber.

7. A perforator apparatus as defined in claim 5, wherein said at least one blower comprises first and second blowers, connected respectively to said first and second suction chambers, for applying suction independently.

8. A perforator apparatus as defined in claim 2, further comprising:

a first valve, connected between said at least one blower and said first suction chamber, for adjusting application of said suction of said at least one blower; and a second valve, connected between said at least one blower and said second suction chamber, for adjusting application of said suction of said at least one blower independently of said first valve.

9. A perforator apparatus as defined in claim 2, wherein said punch includes:

at least one punch portion, disposed to project toward said die, to be received in said die, for forming said perforation in said continuous material; and at least one pilot guide, disposed to project toward said die, arranged downstream from said punch portion, and received in a previously formed perforation, for positioning said continuous material with respect to said punch portion.

10. A perforator apparatus as defined in claim 2, wherein said continuous material is continuous photo film.

11. A perforator apparatus as defined in claim 2, wherein said second pass roller is driven by a motor.

12. A perforator apparatus as defined in claim 2, wherein said first pass roller is driven by a first motor.

13. A perforator apparatus as defined in claim 12, wherein said second pass roller is driven by a second motor.

14. A perforating method for continuous material being conveyed continuously, in which a perforator unit is used and has a punch and a die, said perforator unit forming a train of perforations in said continuous material along at least one edge thereof when said continuous material is stopped, said perforating method comprising steps of:

rotationally controlling a feed roller and a sprocket roller in synchronism and cyclically, said feed roller being disposed upstream from said perforator unit, said sprocket roller being disposed downstream from said perforator unit, such that during one cycle said feed and sprocket rollers each undergo a stopping step of stopping for operation of said perforator unit, and a rotating step of conveying said continuous material through said perforator unit by a same predetermined punching length;

driving a first pass roller, disposed upstream from said feed roller, for continuously conveying said continuous material by said predetermined punching length during said one cycle;

driving a second pass roller, disposed downstream from said sprocket roller, for continuously conveying said continuous material by said predetermined punching length during said one cycle;

previously forming first and second loops in said continuous material, said first loop being disposed between said first pass roller and said feed roller, said second loop being disposed between said second pass roller and said sprocket roller, said first and second loops respectively having a length substantially of an arc of a semi-circle; and applying suction to said first loop through a first suction chamber and to said second loop through a second suction chamber, thereby applying tension to said continuous material which passes through said perforator unit.

15. A perforating method as defined in claim 14, wherein said punch includes:

at least one punch portion, disposed to project toward said die, to be received in said die, for forming said perforation in said continuous material; and at least one pilot guide, disposed to project toward said die, arranged downstream from said punch portion, and received in a previously formed perforation, for positioning said continuous material with respect to said punch portion.

16. A perforating method as defined in claim 14, further comprising steps of:

controlling a first valve connected to said first suction chamber, for adjusting application of said suction; and controlling a second valve connected to said second suction chamber, for adjusting application of said suction independently of said first valve.

17. A perforating method as defined in claim 14, wherein a distance between said first pass roller and said feed roller is set equal to a distance between said second pass roller and said sprocket roller, so as to form said first and second loops of substantially equal length.

18. A perforating method as defined in claim 17, further comprising steps of:

using a first indexing device for rotationally controlling said feed roller; and using a second indexing device for rotationally controlling said sprocket roller.

19. A perforating method as defined in claim 14, wherein said step of driving said second pass roller includes driving said second pass roller with a motor.

20. A perforating method as defined in claim 14, wherein said step of driving said first pass roller includes driving said first pass roller with a first motor.

21. A perforating method as defined in claim 20, wherein said step of driving said second pass roller includes driving said second pass roller with a second motor.

* * * * *